United States Patent
Srinivasan et al.

(10) Patent No.: US 11,105,782 B2
(45) Date of Patent: Aug. 31, 2021

(54) FAST STARTUP ION CHROMATOGRAPHY SYSTEM AND METHODS

(71) Applicant: DIONEX CORPORATION, Sunnyvale, CA (US)

(72) Inventors: Kannan Srinivasan, Tracy, CA (US); Mrinal Sengupta, Fremont, CA (US); Yan Liu, Palo Alto, CA (US); Christopher A. Pohl, Union City, CA (US); Nebojsa Avdalovic, Cupertino, CA (US)

(73) Assignee: Dionex Corporation, Sunnyvale, CA (US)

( * ) Notice: Subject to any disclaimer, the term of this patent is extended or adjusted under 35 U.S.C. 154(b) by 42 days.

(21) Appl. No.: 15/729,480

(22) Filed: Oct. 10, 2017

(65) Prior Publication Data

US 2019/0107518 A1    Apr. 11, 2019

(51) Int. Cl.
*G01N 30/00*    (2006.01)
*G01N 30/96*    (2006.01)
(Continued)

(52) U.S. Cl.
CPC ............. *G01N 30/96* (2013.01); *G01N 30/34* (2013.01); *G01N 2030/285* (2013.01)

(58) Field of Classification Search
CPC ...................................................... G01N 30/96
(Continued)

(56) References Cited

U.S. PATENT DOCUMENTS

| 4,999,098 A | 3/1991 | Pohl et al. |
| 6,077,434 A | 6/2000 | Srinivasan et al. |

(Continued)

FOREIGN PATENT DOCUMENTS

| CN | 101236183 A | 8/2008 |
| CN | 101861519 A | 10/2010 |

(Continued)

OTHER PUBLICATIONS

Dionex Product Manual, Eluent Generator Cartridges, 065018, Jun. 2014, 86 pages.
(Continued)

*Primary Examiner* — Christine T Mui
*Assistant Examiner* — Emily R. Berkeley

(57) ABSTRACT

Systems and methods for inhibiting translocation of ions across ion exchange barriers include an eluent generator having an ion source reservoir with a first electrode, an eluent generation chamber with a second electrode, an ion exchange barrier disposed therebetween, and means for reversing the polarity of a voltage or current applied across the first and second electrodes. A first polarity voltage or current applied across the electrodes generates an electric field that promotes translocation of eluent counter ions from the reservoir across the barrier, where the counter ions combine with eluent ions electrolytically generated in the chamber. By reversing the polarity of the voltage or current across the electrodes, the resulting electric field inhibits translocation of counter ions across the barrier from the reservoir into the chamber. Reverse voltage or current bias reduces counter ion concentration in the resting chamber to prevent exhaustion of ion suppressor capacity during start up.

20 Claims, 10 Drawing Sheets

(51) Int. Cl.
*G01N 30/34* (2006.01)
*G01N 30/28* (2006.01)

(58) Field of Classification Search
USPC .......................................................... 436/161
See application file for complete search history.

(56) References Cited

U.S. PATENT DOCUMENTS

| | | |
|---|---|---|
| 6,225,129 B1 | 5/2001 | Liu et al. |
| 6,328,885 B1 | 12/2001 | Srinivasan et al. |
| 6,544,484 B1 | 4/2003 | Kaufman et al. |
| 6,568,245 B2 | 5/2003 | Kaufman |
| 6,682,701 B1 | 1/2004 | Liu et al. |
| 8,415,168 B2 | 4/2013 | Liu et al. |
| 2004/0048389 A1 | 3/2004 | Nebojsa et al. |
| 2005/0051485 A1 | 3/2005 | Saini |
| 2009/0218238 A1 | 9/2009 | Dasgupta et al. |
| 2013/0220814 A1 | 8/2013 | Dasgupta |
| 2014/0069176 A1* | 3/2014 | Liu .................. B01D 15/166 73/61.55 |
| 2017/0131319 A1 | 5/2017 | Elkin |

FOREIGN PATENT DOCUMENTS

| | | |
|---|---|---|
| CN | 202693540 U | 1/2013 |
| CN | 104698112 A | 6/2015 |
| EP | 0 979 131 | 2/2000 |
| EP | 2 881 496 | 6/2015 |
| JP | 2001520752 A | 10/2001 |
| JP | 2008520960 A | 6/2008 |
| JP | 2011504411 A | 2/2011 |

OTHER PUBLICATIONS

Verma, "What is Eluent Generation," White Paper 70607, 3 pages, 2013.

* cited by examiner

FAST STARTUP ION CHROMATOGRAPHY SYSTEM AND METHODS

CROSS-REFERENCE TO RELATED APPLICATIONS

Not applicable.

BACKGROUND OF THE INVENTION

1. Technical Field

The present disclosure relates generally to systems and methods for inhibiting translocation of eluent and/or ions across an ion exchange barrier, particularly in an eluent generation device for generating a high purity acid or base, particularly for use as a chromatography eluent, and to a method of using the apparatus.

2. Relevant Technology

In liquid chromatography systems, a sample containing a number of components to be separated is directed through a chromatography separator, such as an ion exchange resin bed, typically disposed in a column or cartridge. The sample components are separated via elution from the bed by means of an eluent, such as an ionic solution. One effective form of liquid chromatography is referred to as ion chromatography. In this technique, ion analytes to be detected in a sample solution are bound to the separator, washed, eluted using an eluent, often containing an acid or base, directed to a suppressor, and detected, typically by an electrical conductivity detector. In the suppressor, the electrical conductivity of the electrolyte eluent is suppressed but not that of the separated ion analytes, so the latter may be detected by the conductivity detector. This technique is described in detail in U.S. Pat. Nos. 4,999,098, 6,077,434, and 6,328,885, the entirety of each of which is incorporated herein by specific reference.

The eluent for ion chromatography can be generated with an eluent generator, which can generate high purity eluents at predetermined concentrations. A controlled and precise amount of an electric current can be applied to electrolyze water to generate hydroxide and hydronium ions. Eluent generation is desirable because it circumvents the need to manually prepare eluents from concentrated acids and bases. Often the manual preparation of eluents is both labor intensive and involves working with hazardous chemicals. Eluent generators can be configured so that the only user added reagent is deionized water, which is pumped into the eluent generation cartridge. Furthermore, since the instrument pump seals and pistons only come in contact with deionized water instead of acids and bases which can salt out and come out of solution, overall pump maintenance is significantly reduced. It is also worthwhile to note that since eluent generators create eluent immediately before use in an ion chromatography system, this reduces the likelihood of contaminants such as carbon dioxide from ambient air from contaminating the eluent. An example of an eluent generator is described in U.S. Pat. No. 6,225,129, the entirety of which is incorporated herein by specific reference. Such techniques are applicable to chromatography, specifically ion chromatography, as well as other analytical applications using acid or base such as flow injection analysis and the like.

One drawback to existing analyte detection systems is that eluent generators (e.g. a component of an ion exchange chromatography system) and related systems, under certain circumstances, may require a substantial amount of startup and/or equilibration time before analyte ions can be processed (e.g., injected) for identification and/or quantification. Such startup and/or equilibration time results in an inefficient use of an analyst's time. Accordingly, it would be beneficial to provide systems and methods for reducing the startup and/or equilibration time of eluent generators and related systems so that an analyst can process more samples per day.

BRIEF SUMMARY

Overview and Technical Problem

Eluent generation systems include an eluent generator cartridge having an ion source reservoir containing an ion source (e.g., a fluid ions source or solution). The ion source and/or reservoir contains eluent counter ions, usually at a high concentration (e.g., typically about 2-4 N). The eluent generator cartridge also includes an eluent generation chamber and at least an ion exchange barrier disposed between the ion source reservoir and the eluent generation chamber. The ion exchange barrier can substantially prevent liquid flow, and generally allows passage of one ion type (i.e., positive or negative, but not both) through the ion exchange barrier while providing an ion transport bridge that permits the transport of the eluent counter ions from the source reservoir to the generator chamber. Accordingly, the eluent generation chamber is isolated or fluidly separated from the ion source reservoir by the ion exchange barrier. The system also includes a source electrode in physical and/or electrical communication with the ion source disposed in the ion source reservoir and a generator electrode in physical and/or electrical communication with the eluent generation chamber and/or a liquid (e.g., water, such as deionized water) disposed therein. In some embodiments, the electrode(s) may be made of perforated platinum.

During operation of a cation hydroxide eluent generation, for example, the liquid stream flows through the eluent generation chamber so as to be in communication with the generator electrode. The ion source reservoir can contain a high concentration hydroxide solution, such as KOH, NaOH, LiOH, etc. In response to a voltage having a first polarity applied across the electrodes (or current or charge flow in a first direction between the electrodes), the generator electrode can produce eluent ions (e.g., $OH^-$) in the eluent generation chamber through a water-splitting reaction. Similarly, the source electrode can produce hydronium (i.e., $H_3O^+$) or $H^+$ in the ion source reservoir through water-splitting reaction in response to the first polarity voltage (or first direction current or charge flow). The produced hydronium reacts with hydroxide present in the reservoir to produce water. This produces an excess charge since there is now an excess of cation relative to anion, which results in the ejection of the excess cation. Thus, production of an electric field between the ion source reservoir and the eluent generation chamber drives (or promotes) transport of eluent counter ions (e.g., $K^+$, $Na^+$, $Li^+$, etc.) from the source reservoir, across the membrane, and into the generation chamber, where the counter ions combine with the produced eluent ions (e.g., $OH^-$) to form eluent (e.g., KOH, NaOH, LiOH, etc.). The generated eluent is carried by the stream flow out of the cartridge, through one or more further processing components (e.g., a trap column, such as a continuously-regenerated trap column (CR-TC), a degasser, a backpressure control element, such as a coil, an injector, a guard column, etc.) and, ultimately, into the analytical chromatography column to elute the retained analyte molecules of interest.

During downtime, however, when the system is in passive or shutdown mode, or is turned off, neither the stream flow nor the external applied voltage (or current) is operational. It is worthwhile to note that the downtime mode represents a time period where the ion chromatography system is powered down at the end of a work shift of the analyst or that there are no plans to analyze additional samples for a prolonged period of time (e.g. a weekend). In this downtime mode, deionized water is not being pumped through the eluent generation chamber. Applicant believes that many analytical laboratories prefer to power down ion chromatography systems when not analyzing samples to reduce costs for electricity. In an embodiment, powering down ion chromatography systems can include not applying electricity to the pump, suppressor, and detector. During this downtime, an ion exchange membrane can permit eluent in the ion source reservoir to passively diffuse from the reservoir into the generation chamber (e.g., at a passive rate of diffusion towards equilibrium, due to the concentration differential). The eluent can have a pair of ions (e.g., $K^+OH^-$) that has a net neutral charge and can slowly diffuse through an ion exchange membrane based on a concentration gradient.

Over an extended period of time (e.g., hours, days, weeks, etc.), where there is no fluid flow through the generation chamber, the concentration of ions in the resting chamber can be or become substantially similar to the concentration of ions in the reservoir. For instance, in some systems (or cartridges), the volume ratio of reservoir-to-chamber is substantial enough to bring the concentration of ions in the resting chamber (or stationary liquid, such as deionized water, disposed therein) to about 2-4 N. Without being bound to any theory, the passive diffusion stops once the concentration is equal in both the source reservoir and generation chamber. Passive diffusion can cause significant amounts of leakage of ions from the ion source chamber over longer periods of time where the liquid in the generation chamber is quiescent. In contrast to passive diffusion, and without being bound to any theory, an electric field generated between the first and second electrodes can cause ions of one charge to be actively transported through an ion exchange membrane and in some instances at a rate much faster than passive diffusion. The effects of passive diffusion generally increase with decreasing flow rate and when the liquid in the generation chamber is quiescent.

Upon restarting the system by establishing flow, a concentrated ion plug (or slug)—i.e., the stationary liquid with high ion concentration—flows out of the generation chamber and/or cartridge and through the further processing component(s) and/or chromatography column. Transit of the high concentration plug through the system causes multiple issues with the ion chromatograph. For example, the large concentration gradient must be swept or flushed from the system plumbing components (e.g., lines, valves, etc.) before the system can be operated at optimal levels to process (e.g., injected) analyte ions for identification and/or quantification. Sweeping or flushing the plumbing components of the system can be time-consuming and require additional monitoring by operation personnel or users. The issue is worse when the flow rate of the system is low. Alternatively, or in addition, the column may require additional equilibration time to reach a steady, low, baseline reading and/or column equilibration may be affected in other ways. Alternatively, or in addition, the capacity of the ion suppressor (in line downstream of the eluent generator) can be exhausted by the high ion concentration plug, requiring additional time for regeneration of the suppressor. Overall, the impact of the high concentration plug includes added system equilibration time needed for optimal chromatographic operation during analyte ion processing. This additional time translates into additional labor and operation costs.

Solution to Technical Problem

The present disclosure solves one or more of the foregoing issues by providing a solution to passive eluent and/or ion diffusion during times of the eluent generator resting when there is no external applied current or voltage between the electrodes. Some embodiments can include systems and methods for inhibiting accumulation of species ions in an eluent generation chamber. In particular, the present disclosure solves the issue of extended startup and/or equilibration time in ion chromatography (IC) systems (e.g., an ion exchange chromatography system) by applying a reversed bias voltage (or current) on or across the eluent generator (EG) component (or cartridge) during a downtime or in a downtime or idle system mode(s). The reverse voltage bias (or current) generates an electric field that inhibits translocation of eluent (e.g., KOH) and/or eluent counter ions (e.g., $K^+$) across the ion exchange membrane from the source reservoir to the generation chamber, preferably thereby at least partially inhibiting accumulation of the eluent counter ions and/or eluent in a generation chamber.

In at least one embodiment of the present disclosure, a method of inhibiting translocation and/or accumulation of eluent and/or eluent counter ions comprises applying a voltage across a first electrode and a second electrode, the voltage having a second (or reversed) polarity, the first and second electrodes being disposed on first and second sides of an ion exchange membrane, respectively, the applied voltage with the second polarity electrolytically generating hydronium ions at the second side of the ion exchange membrane, the electric field generated between the first and second electrodes inhibiting translocation of the eluent and/or eluent counter ions through (or across) the ion exchange membrane from the first side to the second side, preferably thereby inhibiting accumulation of eluent and/or eluent counter ions at the second side.

In this reversed bias mode, the eluent generator electrode forms ions (either hydronium or hydroxide from the water splitting reaction) that can migrate towards the reservoir electrode (e.g., because of the potential difference across the membrane and/or electrostatic attraction). In an embodiment, cation hydroxide can passively diffuse from the electrolyte reservoir to the generation chamber and hydroxide can be neutralized by the electrolytically generated hydronium ion in the generation chamber. In addition, potassium and/or hydronium ion can be driven from the generation chamber to the electrolyte reservoir.

The system can also be run in an active (or standard) mode, as known in the art, by applying a voltage across a first electrode and a second electrode, the voltage having a first polarity so that electrolytically generated eluent can be used in a chromatographic analysis of a sample containing analyte. The first polarity voltage can generate an electric field that promotes translocation of the eluent counter ions across the ion exchange membrane from the first side to the second side. Some embodiments can include selectively reversing the polarity of the voltage from the first polarity to the second polarity, selectively reversing the polarity of the voltage from the second polarity to the first polarity.

Certain embodiments can include a system for inhibiting translocation and/or accumulation of ions across an ion exchange membrane. The system can include a first electrode in electrical communication with an ion source disposed in an ion source reservoir, a second electrode in electrical communication with an eluent generation chamber, an ion exchange membrane disposed between the ion source reservoir and the eluent generation chamber, and means for reversing the polarity of a voltage across the first and second electrodes. An aqueous fluid, such as deionized water, can be disposed in or flowing through the eluent generation chamber, such that when the voltage is applied across the first and second electrodes with a first polarity, the subsequently generated electric field inhibits eluent counter ions from translocating across the ion exchange membrane into the liquid.

In some embodiments, the reversed bias potential can be applied to reduce translocation of eluent counter ions across an ion exchange membrane, from the reservoir to the generation chamber, during storage, downtime, or non-operation times. Ion transport inhibition can prevent or inhibit the formation of a high concentration plug of ions from the ion source reservoir in the resting generation chamber. Accordingly, startup and/or equilibration time need not include a substantial amount of additional flushing, sweeping, or suppressor regeneration time (prior to injection of analyte ions). The net effect is a faster startup time of the system without the issues associated with a high concentration plug.

Certain embodiments include a method of determining an optimal reverse bias mode voltage or current for achieving reduced startup time. The method can include passing (e.g., pumping) an aqueous fluid or liquid (e.g., deionized water) through the generation chamber while the voltage or current is applied in the reversed bias mode and monitoring the output from the generation chamber (e.g., using a conductivity detector). In some embodiments, the voltage or current is adjusted or optimized until a lowest possible value of conductivity is obtained or observed from the liquid pumped out of the generation chamber. Without being bound to any theory, at the lowest conductivity value, the transport of ions from the reservoir into the eluent generation chamber is at a minimum (or minimal). The voltage or current values associated with the lowest conductivity can be used in one or more storage methods, as described herein. Cartridges stored at the minimal conductivity voltage or current value(s) overnight or over several days (as indicated on the system) can exhibit excellent performance and/or rapid startup and/or equilibration times when normal operation of the system is resumed. For instance, analyte ions can be injected immediately following system startup or within a substantially shortened equilibration period relative to existing systems and methods. The shortened time between startup and analyte ion injection can be less than typical equilibration times.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth hereinafter.

BRIEF DESCRIPTION OF THE DRAWINGS

In order to describe the manner in which the above-recited and other advantages and features of the invention can be obtained, or to further clarify the above and other advantages and features of the present disclosure, a more particular description of the disclosure briefly described above will be rendered by reference to specific implementations and/or embodiments thereof which are illustrated in the appended drawings.

Furthermore, it will be readily appreciated that the components of the illustrative embodiments, as generally described and illustrated in the figures herein, could be arranged and designed in a wide variety of different configurations, and that components within some figures are interchangeable with, or may supplement, features and components illustrated in other figures. Accordingly, understanding that the drawings depict only typical implementations and/or embodiments of the disclosure and are not, therefore, to be considered to be limiting of its scope, the embodiments will be described and explained with additional specificity and detail through the use of the accompanying drawings in which.

DETAILED DESCRIPTION

Figure 1:
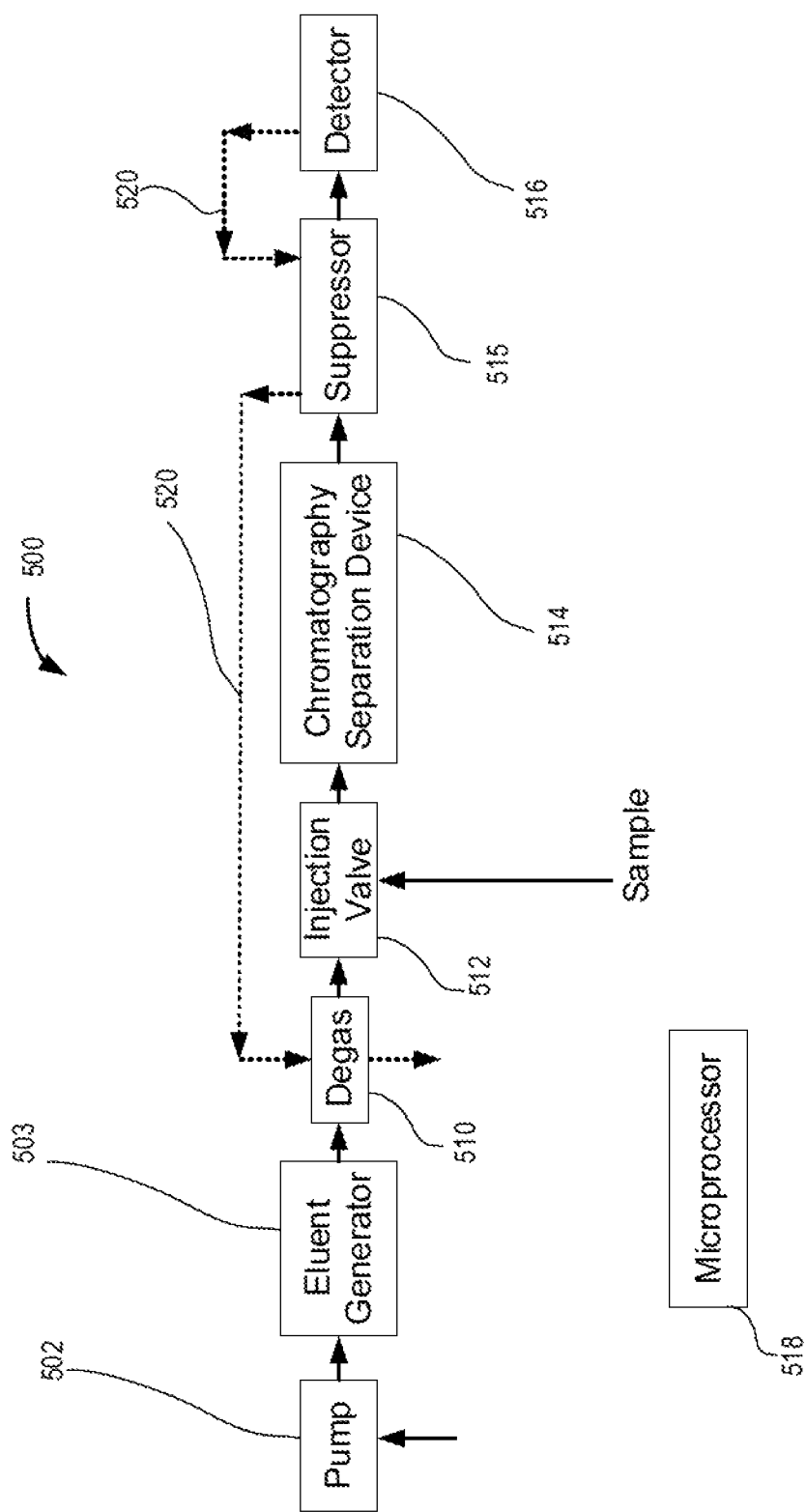
FIG. 1 illustrates a general chromatography system suitable for use with an embodiment of the present disclosure.

Before describing the present disclosure in detail, it is to be understood that this disclosure is not limited to the specific parameters of the particularly exemplified systems, methods, apparatus, assemblies, products, processes, and/or kits, which may, of course, vary. It is also to be understood that much, if not all of the terminology used herein is only for the purpose of describing particular embodiments of the present disclosure, and is not necessarily intended to limit the scope of the disclosure in any particular manner. Thus, while the present disclosure will be described in detail with reference to specific configurations, embodiments, and/or implementations thereof, the descriptions are illustrative only and are not to be construed as limiting the scope of the claimed invention.

Unless defined otherwise, all technical and scientific terms used herein have the same meaning as commonly understood by one of ordinary skill in the art to which the present disclosure pertains. While a number of methods and materials similar or equivalent to those described herein can be used in the practice of the present disclosure, only certain exemplary materials and methods are described herein.

Various aspects of the present disclosure, including systems, methods, and/or products may be illustrated with reference to one or more embodiments or implementations, which are exemplary in nature. As used herein, the terms "embodiment" and "implementation" mean "serving as an example, instance, or illustration," and should not necessarily be construed as preferred or advantageous over other aspects disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the description thereof.

As used throughout this application the words "can" and "may" are used in a permissive sense (i.e., meaning having the potential to), rather than the mandatory sense (i.e., meaning must). Additionally, the terms "including," "having," "involving," "containing," "characterized by," as well as variants thereof (e.g., "includes," "has," and "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively.

As used in this specification and the appended claims, the singular forms "a," "an" and "the" each contemplate, include, and specifically disclose both the singular and plural referents, unless the context clearly dictates otherwise. For example, reference to an "analyte" contemplates and specifically discloses one, as well as two or more analytes.

Various aspects of the present disclosure can be illustrated by describing components that are coupled, attached, connected, and/or joined together. As used herein, the terms "coupled", "attached", "connected," and/or "joined" are used to indicate either a direct association between two components or, where appropriate, an indirect association with one another through intervening or intermediate components. In contrast, when a component is referred to as being "directly coupled", "directly attached", "directly connected," and/or "directly joined" to another component, no intervening elements are present or contemplated. Thus, as used herein, the terms "connection," "connected," and the like do not necessarily imply direct contact between the two or more elements. In addition, components that are coupled, attached, connected, and/or joined together are not necessarily (reversibly or permanently) secured to one another. For instance, coupling, attaching, connecting, and/or joining can comprise placing, positioning, and/or disposing the components together or otherwise adjacent in some implementations.

As used herein, directional and/or arbitrary terms, such as "top," "bottom," "front," "back," "rear," "left," "right," "up," "down," "upper," "lower," "inner," "outer," "internal," "external," "interior," "exterior," "proximal," "distal," and the like can be used solely to indicate relative directions and/or orientations and may not otherwise be intended to limit the scope of the disclosure, including the specification, invention, and/or claims.

It will also be appreciated that where two or more values, or a range of values (e.g., less than, greater than, at least, and/or up to a certain value, and/or between two recited values) is disclosed or recited, any specific value or range of values falling within the disclosed values or range of values is likewise specifically disclosed and contemplated herein. Thus, disclosure of an illustrative measurement (e.g., length, width, thickness, etc.) that is less than or equal to about 10 units or between 0 and 10 units includes, illustratively, a specific disclosure of: (i) a measurement of 9 units, 5 units, 1 units, or any other value between 0 and 10 units, including 0 units and/or 10 units; and/or (ii) a measurement between 9 units and 1 units, between 8 units and 2 units, between 6 units and 4 units, and/or any other range of values between 0 and 10 units.

1. In the present disclosure, example systems, methods, and/or apparatus may be described with reference to one or more analytes or analyte molecules (of interest). It should be appreciated that as used herein, "analyte" can refer to a substance whose chemical constituent(s) are being analyzed (e.g., detected, isolated, separated, identified, measured, quantified, etc.) and/or the chemical constituent(s) themselves (i.e., a chemical substance that is the subject of chemical analysis, a substance or chemical constituent that is of interest in an analytical procedure, etc.). Thus, an illustrative fluid (e.g., drinking water) sample can be and/or constitute an analyte having or comprising one or more analyte molecules of interest disposed or contained therein. Alternatively or in addition, the one or more analyte molecules of interest disposed or contained in the drinking water sample can likewise constitute analyte(s). Thus, where appropriate, an analyte (i.e., fluid sample) can be introduced into a chromatography member (e.g., concentrator and/or analytical column) configured to retain the analyte (i.e., molecule(s) of interest) in one or more embodiments.

2. Moreover, as used herein, a "molecule" or "molecule of interest" includes other matter of interest, including but not limited to cells, particles, compounds, crystals, aggregates, etc. For instance, in at least one embodiment, a molecule of interest can comprise phosphate, sulfate, nitrate, nitrite, bromate, chlorite, or another molecular compound, including acids, hydrocarbons, and the like. In other embodiments, a molecule of interest can comprise a (charged) elemental molecule, such as fluoride, chloride, bromide, arsenic, barium, chromium, etc., as well as compounds including the same. Thus, reference to a "molecule" or "molecule of interest" should not be construed as being limited to a (single) molecule, per se. Rather, such terms should be construed broadly to include any substance or matter (e.g., that may be present or included in a liquid sample).

In addition, example systems, methods, and/or apparatus may be described with reference to one or more ions, ionic molecules, ionized molecules, charged molecules, and the like. It will be appreciated that such terms are illustrative and/or representative of analytes, in general, and should be understood accordingly.

As used herein, "ion exchange barrier," and similar terms may include, without limitation, an ion exchange membrane in the form of thin sheets, a stack of ion exchange membranes, an ion exchange cylinder, or an ion exchange connector as known in the art and/or described herein.

It is further to be understood that some of the drawings included herewith, and which are referenced herein, are diagrammatic and schematic representations of example embodiments, and are not limiting of the present disclosure. Moreover, while various drawings are provided at a scale that is considered functional for some embodiments, the drawings are not necessarily drawn to scale for all contemplated embodiments. It should be understood that the scale may be varied and the illustrated embodiments are not necessarily drawn to scale for all embodiments encompassed herein. Accordingly, no inference should be drawn from the drawings as to the necessity of any scale.

Furthermore, in the exemplary embodiments illustrated in the figures, like structures will be provided with similar reference designations, where possible. Specific language will be used herein to describe the exemplary embodiments. Nevertheless it will be understood that no limitation of the scope of the disclosure is thereby intended. It is to be understood that the drawings are diagrammatic and schematic representations of various embodiments of this disclosure, and are not to be construed as limiting the scope of the disclosure, unless such shape, form, scale, function, or other feature is expressly described herein as essential.

While the detailed description is separated into sections, the section headers and contents within each section are not intended to be self-contained descriptions and embodiments. Rather, the contents of each section within the detailed description are intended to be read and understood as a collective whole where elements of one section may pertain to and/or inform other sections. Accordingly, embodiments specifically disclosed within one section may also relate to and/or serve as additional and/or alternative embodiments in another section having the same and/or similar systems, devices, methods, and/or terminology.

Analyte Detection System and Methods

Certain embodiments of the present disclosure relate generally to systems and methods for detecting and quantifying one or more analyte molecules of interest. For example, the following describes a general chromatography system suitable for use with some embodiments of the chromatography columns and methods described herein. FIG. 1 illustrates an embodiment of an ion chromatography system 500 that includes a pump 502, an electrolytic eluent generating device 503, a degas assembly 510, an injection valve 512, a chromatography separation device 514, a suppressor 515, a detector 516, and a microprocessor 518. A recycle line 520 may be used to transfer the liquid from an output of detector 516 to a regenerant portion of suppressor 515, and then to an inlet of degas assembly 510.

Pump 502 can be configured to pump a liquid from a liquid source and be fluidically connected to electrolytic eluent generating device 503. Electrolytic eluent generating device 503 is configured to generate an eluent such as for example KOH or methanesulfonic acid. Details regarding electrolytic eluent generating devices (e.g., eluent generator) can be found in U.S. Pat. Nos. 6,225,129 and 6,682,701, which are hereby incorporated by reference herein. In an embodiment, a residual gas may be carbon dioxide, hydrogen, and oxygen. The gas can be swept out of degas assembly 510 using a recycled liquid via a recycle line 520 that is downstream of detector 516. Injection valve 512 can be used to inject an aliquot of a liquid sample into an eluent stream. Chromatography separation device 514 (e.g., chromatography column) can be used to separate various matrix components present in the liquid sample from the analytes of interest. An output of chromatography separation device 514 can be fluidically connected to suppressor 515, and then to detector 516 to measure the presence of the separated chemical constituents of the liquid sample.

Suppressor 515 is a device used in ion chromatography to remove the eluent and sample counter ions and replace them with regenerant ions. As a result, the eluent is converted to a weakly dissociated form prior to entering the detector. The suppressor allows analyte ions to be detected with a conductivity detector with a low background. Furthermore, the analytes can be converted to the more conductive acid or base form, which enhances the signal, particularly for fully dissociated species. Detail regarding suppressors can be found in U.S. Pat. Nos. 4,999,098; 6,328,885; and 8,415,168 which are hereby fully incorporated by reference herein.

Detector 516 may be in the form of ultraviolet-visible spectrometer, a fluorescence spectrometer, an electrochemical detector, a conductometric detector, a charge detector, or a combination thereof. Details regarding the charge detector that is based on a charged barrier and two electrodes can be found in US Pre-Grant Publication No. 20090218238, which is hereby fully incorporated by reference herein. For the situation where recycle line 520 is not needed, detector 516 may also be in the form of a mass spectrometer or a charged aerosol detector. The charged aerosol detector nebulizes the effluent flow and creates charged particles that can be measured as a current proportional to the analyte concentration. Details regarding the charged aerosol detector can be found in U.S. Pat. Nos. 6,544,484; and 6,568,245, which are hereby fully incorporated by reference herein.

An electronic circuit may include microprocessor 518 and a memory portion. Microprocessor 518 can be used to control the operation of chromatography system 500. Microprocessor 518 may either be integrated into chromatography system 500 or be part of a personal computer that communicates with chromatography system 500. Microprocessor 518 may be configured to communicate with and control one or more components of chromatography system such as pump 502, electrolytic eluent generating device 503, injection valve 512, and detector 516. Note that chromatography system 500 is a particular machine used to analyze standard solutions and sample solutions to identify chemical constituents and the associated concentration values.

Eluent Generator Systems and Methods

Figure 2A:
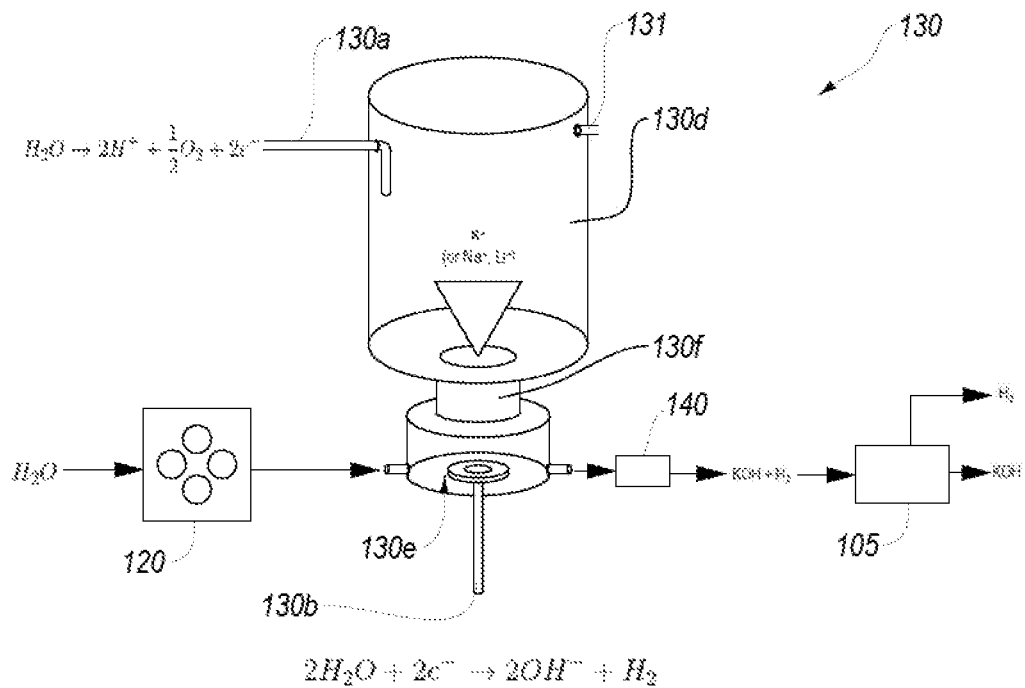
FIG. 2A illustrates an eluent generation systems or module in accordance with an embodiment of the present disclosure.
Figure 2B:
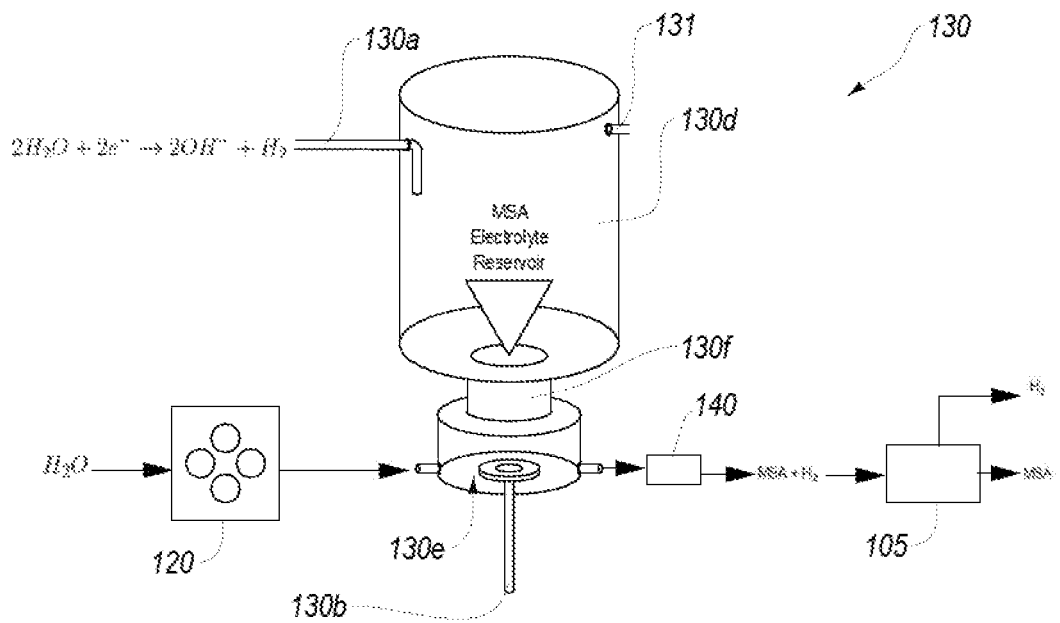
FIG. 2B illustrates an eluent generation systems or module in accordance with another embodiment of the present disclosure.

FIGS. 2A and 2B illustrate two exemplary eluent generation systems or components according to certain embodiments of the present disclosure. Further details and examples of such systems or components are disclosed in references previously cited and incorporated by reference herein.

FIG. 2A depicts an eluent generation system for cation hydroxide that includes a pump 120, an eluent generator cartridge 130, a trap column 140, and a degas module 105. The eluent generator cartridge 130 has a low pressure electrolyte reservoir 130d (or ion source reservoir), a high pressure eluent generation chamber 130e, and an ion exchange connector or membrane 130f (e.g., disposed between the electrolyte reservoir 130d and the eluent generation chamber 130e). As depicted, electrolyte reservoir 130d contains a fluid ion source with eluent counter ions (or species ions)—e.g., $K^+$, $Na^+$, or $Li^+$, and also contains corresponding hydroxide ions, in the present embodiment. The counter ions and corresponding hydroxide ions can be at any suitable starting concentration (e.g., typically about 2-4 N).

In some embodiments, the eluent generation chamber 130e can be pressurized. For instance, the eluent generation chamber 130e can be pressurized and maintained at a pressure of about 100 to about 15000 psi, preferably about 1000 to about 5000 psi. As depicted in FIG. 2A, ion source reservoir 130$d$ has a vent 131 that is open to ambient pressure.

The ion exchange barrier, connector or membrane 130$f$ can comprise a species ion-permeable membrane. For instance, the ion exchange connector or membrane 130$f$ can comprise a cation exchange membrane that permits the transport of the cations. The ion exchange connector or membrane 130$f$ can substantially prevent liquid flow and, preferably, reducing anion passage through the cation exchange membrane while providing an ion transport bridge that permits the transport of the cationic eluent counter ions from the (low-pressure) ion source reservoir 130$d$ to the (high-pressure) eluent generation chamber 130$e$. Accordingly, the eluent generation chamber 130$e$ is isolated or fluidly separated from the ion source reservoir 130$d$ by the ion exchange membrane 130$f$. Ion exchange membrane 130$f$ can be in form of a stack of multiple membranes. The system also includes a source electrode 130$a$ (e.g., perforated platinum foil or platinum wire) in electrical communication with or disposed in the ion source disposed in the ion source reservoir 130$d$ and a generator electrode 130$b$ (e.g., perforated platinum foil or platinum wire) in electrical communication with or disposed in the eluent generation chamber 130$e$ and/or an liquid (e.g., concentrator effluent or water, such as deionized water) disposed therein.

Figure 3A:
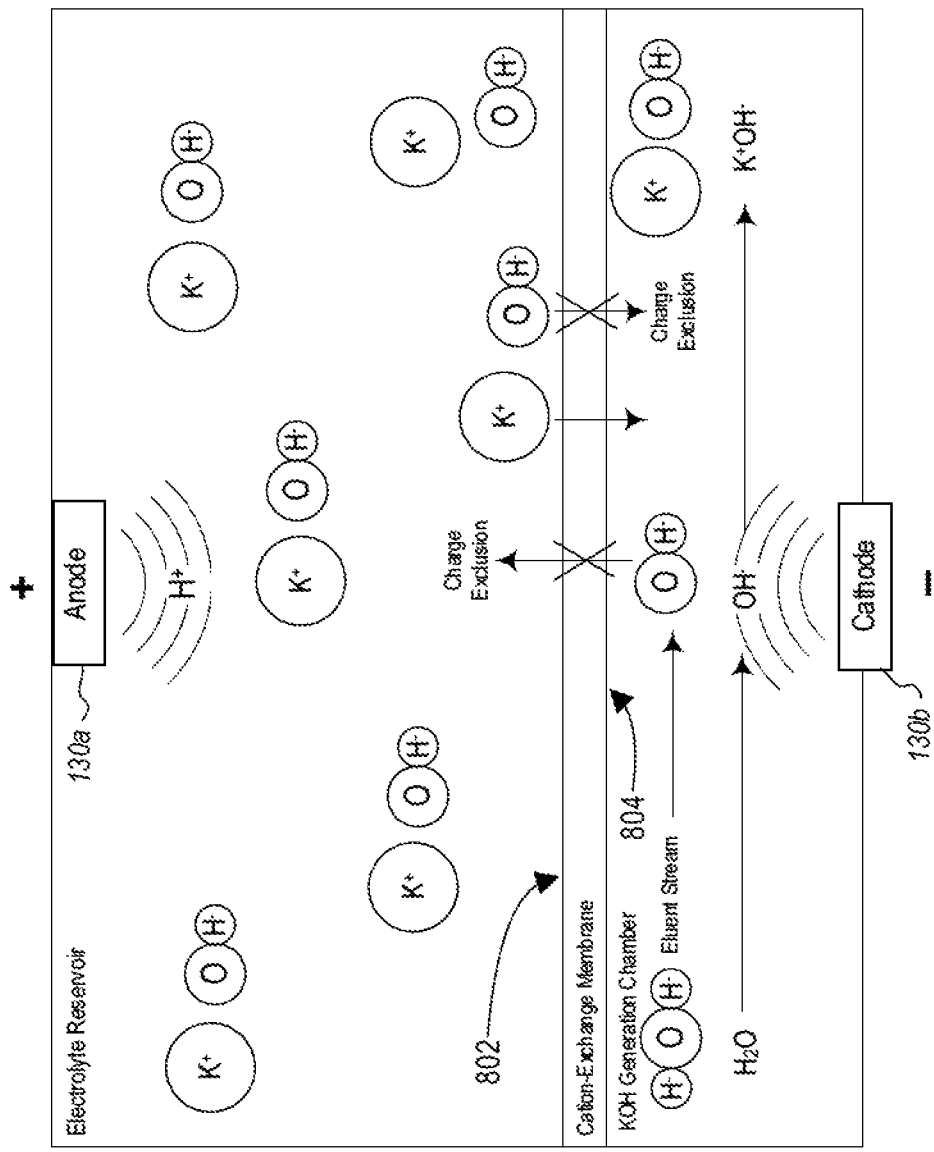
FIG. 3A illustrates a schematic flow diagram for an eluent generation systems or module in accordance with an embodiment of the present disclosure.

During (normal) operation of a KOH eluent generation component, as further depicted in FIG. 3A, for example, the liquid (eluent) stream (e.g., deionized water) flows through the (high-pressure) KOH eluent generation chamber so as to be in communication with the generator electrode, which serves or functions as a cathode in the present embodiment. In response to a voltage having a first polarity applied across the electrodes (or current or charge flow in a first direction between the electrodes), the generator electrode produces eluent ions ($OH^-$, in the present embodiment) and hydrogen gas in the eluent generation chamber through a water-splitting reaction (i.e., water reduction reaction). Similarly, the reservoir electrode, which serves or functions as an anode in the present embodiment, produces $H^+$ or $H_3O^+$, in the present embodiment, and oxygen gas in the ion source reservoir through water-splitting reaction (i.e., water oxidation reaction) in response to the first polarity voltage (or first direction current or charge flow).

Referring back to FIG. 3A, application of an electric field between the (low-pressure) electrolyte reservoir and the KOH generation chamber drives (or promotes) transport of eluent counter ions ($K^+$, in the present embodiment) from the source reservoir, across the ion exchange connector (comprising a cation exchange membrane in the present embodiment), and into the generation chamber. Specifically, $H^+$ or $H_3O^+$ ions generated at the anode combines with the hydroxide to form water while $K^+$ ions migrate in the electrolyte reservoir and move towards the cathode. For each hydronium ion being formed in the electrolyte reservoir, one $K^+$ can be displaced and migrate across the cation exchange membrane into the eluent generation chamber, where the eluent counter ions combine with the produced $^-OH$ eluent ions generated at the cathode to form KOH eluent solution, which can be used as the eluent for anion exchange chromatography. The hydronium formed in the electrolyte reservoir reacts with a hydroxide ion in the electrolyte reservoir to form water. The hydroxide generated in the eluent generation chamber mostly remains in that chamber as the cation exchange membrane inhibits (e.g., reduces or substantially reduces) the transport of negatively charged ions. The extent to which the cation exchange membrane inhibits anion transport is dependent upon the concentration of the electrolyte in the reservoir and the concentration of the ion exchange sites in the membrane. The closer these two concentrations are, the greater the anion transport rate. The concentration of generated KOH is proportional to the magnitude of the current flowing to the generator component or across the electrodes and the eluent stream (e.g., water) flow rate through the generation chamber. Therefore, given the eluent stream flow rate, the eluent generator module can accurately and reproducibly generate KOH at one or more desired concentrations based on an input current. The continuously flowing water stream carries the generated eluent out of the cartridge.

The eluent-containing stream can then flow through one or more further processing components (e.g., trap column 140, degasser 105, etc.) and into an anion exchange chromatography column to elute retained analyte molecules of interest, as known in the art. In some embodiments, the chromatography column can be a concentrator column for retaining analytes of interest to be eluted in a smaller volume than that of the introduced analyte stream, as known in the art. In some embodiments, the chromatography column can be an analytical column for separate elution of retained analytes of interest for analytical detection (e.g., conductivity or other measurement), as known in the art. It will be appreciated that the above description for the generation of KOH eluent can be applied to the generation of NaOH, LiOH, or other suitable eluent.

Figure 3B:
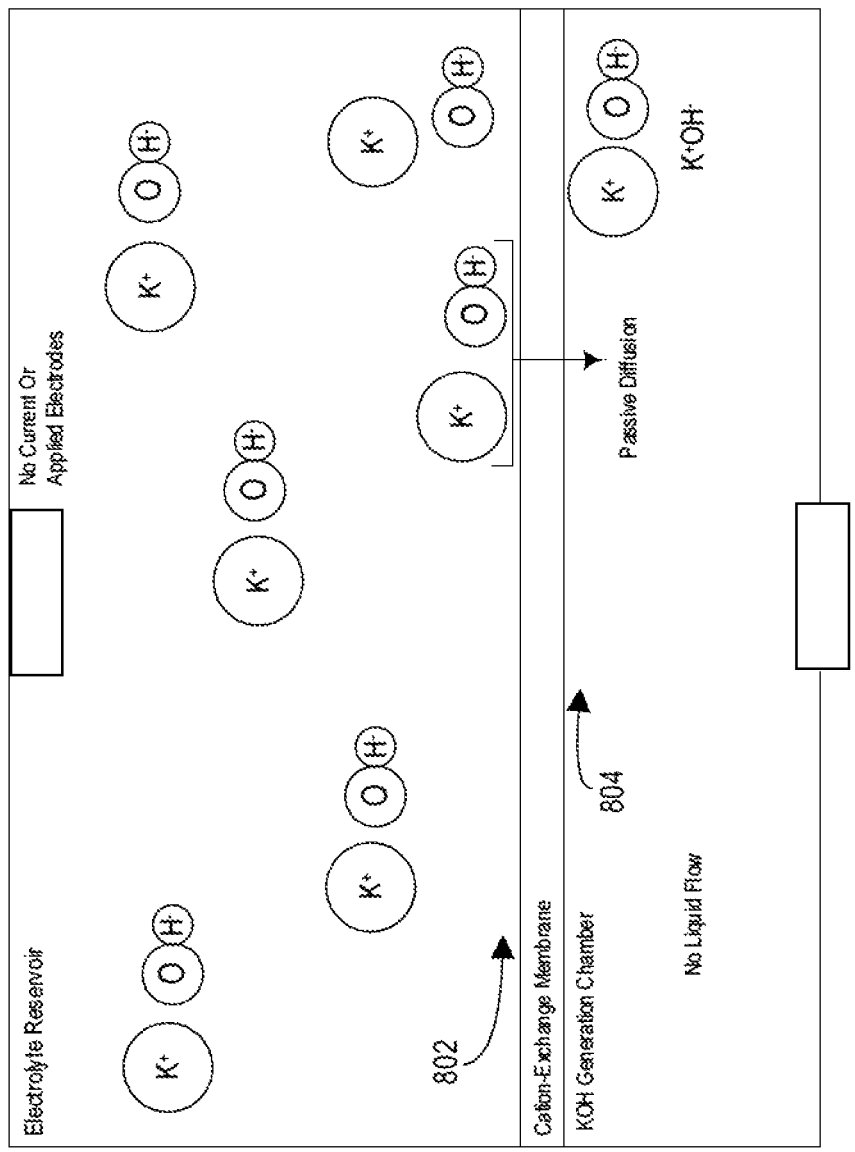
FIG. 3B illustrates a schematic flow diagram for an eluent generation systems or module in accordance with another embodiment of the present disclosure.

FIG. 3B is a schematic representing an eluent generator in a passive mode or turned off where neither the liquid is flowing through the generation chamber nor the voltage (or current) is applied to the electrodes. In this situation, passive diffusion can occur because of the relatively large concentration differential between the KOH in the electrolyte reservoir (2-4 N) and the non-flowing deionized water in the KOH generation chamber. Since the volume of the KOH generation chamber is relatively small, the liquid is quiescent, and the passive mode can be for an extended period of time (e.g. several hours), the build of up passively diffused KOH can be significant and interfere with the ion chromatographic analysis. It should be noted that a flowing liquid reduces the effects of passive diffusion of KOH because it does not have a chance to build up in the generation chamber. The above description for the generation of hydroxide eluent can be applied to the generation of acid. FIG. 2B depicts an alternative embodiment in which reservoir 130$d$ contains the eluent counter ion methanesulfonate species ions ($MSA^-$) and ion exchange connector or membrane 130$f$ comprises an anion exchange connector having an anion exchange membrane that permits the passage of anions while reducing the passage of cations and fluid. In this embodiment, the reservoir electrode 130$a$ serves or functions as a cathode and the generation chamber electrode 130$b$ serves or functions as an anode during normal operation. The water splitting reaction (i.e., water reduction reaction) generates $OH^-$ ions in the reservoir, which combine with $H^+$ already in the reservoir to form water, while the potential drives $MSA^-$ species ions in the electrolyte reservoir into the eluent generation chamber. Thus, the electric field between the two electrodes causes the $MSA^-$ species ions to migrate through or across the anion exchange membrane and into the eluent generation chamber. The migrated $MSA^-$ ions combine with electrolytically produced $H^+$ eluent ions generated at the anode in the eluent generation chamber through the (anodal) water splitting reaction (i.e., water oxidizing reaction), to produce a methanesulfonic acid (MSA) solution, which can be used as the eluent for cation exchange chromatography.

The concentration of generated MSA is proportional to the magnitude of the current flowing to the generator component or across the electrodes and the eluent stream (e.g., water) flow rate through the generation chamber. Therefore, given the eluent stream flow rate, the eluent generator module can accurately and reproducibly generate MSA at one or more desired concentrations. The continuously flowing water stream carries the generated eluent out of the cartridge.

The eluent-containing stream can then flow through one or more further processing components (e.g., trap column 140, degasser 105, etc.) and into a cation exchange chromatography column to elute retained analyte molecules of interest therefrom, as known in the art. In some embodiments, the chromatography column can be a concentrator column for retaining analytes of interest to be eluted in a smaller volume than that of the introduced analyte stream, as known in the art. In some embodiments, the chromatography column can be an analytical column for separate elution of retained analytes of interest for analytical detection (e.g., conductivity or other measurement), as known in the art. It will be appreciated that the above description of a generator used for the generation of MSA eluent can be applied to the generation of other suitable eluents.

Thus, in normal operation (see FIG. 3A), a first polarity voltage applied across the electrodes electrolytically generates hydroxide or hydronium ions at the first side of the ion exchange membrane (e.g., in the reservoir). The negatively charged hydroxide is generated in the reservoir when the eluent counter ion (e.g., $MSA^-$) is negatively charged. Similarly, the positively charged hydronium is generated in the reservoir when the eluent counter ion (e.g., $K^+$) is positively charged. The first polarity voltage also generates an electric field that promotes the translocation of species ions (eluent counter ions) across the ion exchange membrane from the first (reservoir) side 802 to the second (chamber) side 804. Accordingly, at least one embodiment can include applying a voltage across a first electrode 130$a$ and a second electrode 130$b$, the voltage having a first polarity, the first and second electrodes being disposed, respectively, on first and second sides of an ion exchange membrane, the applied voltage with the first polarity electrolytically generating hydronium ions at the first side of the ion exchange membrane, the electric field promoting the translocation of eluent counter ions through the ion exchange membrane from the first side to the second side.

Embodiments of the present disclosure can also include selectively reversing the polarity of the voltage applied between the electrodes from the first polarity to a second polarity. Accordingly, the second polarity can be opposite the first polarity, as understood by those skilled in the art. The electric field generated by applying the second polarity voltage (i) drives eluent counter ions from the second (chamber) side to the first (reservoir) side (i.e., across the ion exchange membrane) and/or (ii) inhibits translocation of the eluent counter ions and/or eluent through the ion exchange membrane from the first side to the second side, preferably thereby inhibiting accumulation of the eluent counter ions and/or eluent on the second side. Applicant has observed a decrease in the passive diffusion of eluent across the ion exchange barrier from the electrolyte reservoir to the generation chamber during the application of the reverse bias electric field. As such, without being bound by any theory, the reverse bias electric field inhibits the passive diffusion of eluent across the ion exchange barrier.

For instance, when the polarity of the voltage is selectively reversed from the first polarity to the second polarity, the eluent generation chamber may contain an amount of the same electrolyte(s) that are present in the source ion reservoir. By way of example, the eluent generation chamber may contain hydroxide electrolytically generated in the eluent generation chamber and/or eluent counter cation (e.g., $K^+$, $Na^+$, or $Li^+$) transported from the reservoir to the chamber by means of the electric field generated by the first polarity voltage applied during normal operation mode, as described above. In the above cation hydroxide example, selectively reversing the polarity of the voltage from the first polarity to the second polarity can inhibit the translocation of eluent from the electrolyte reservoir through the ion exchange barrier and to the generation chamber. In addition, under certain circumstances, the second polarity may also electrolytically generate hydronium ions at the second (chamber) side of the ion exchange membrane and/or in the eluent generation chamber (or fluid disposed therein). In this reversed polarity mode, the hydronium ions can react with hydroxide present in the eluent generation chamber to form water, thereby driving the eluent counter cation towards the reservoir electrode—now cathode—to maintain charge balance.

Figure 3C:
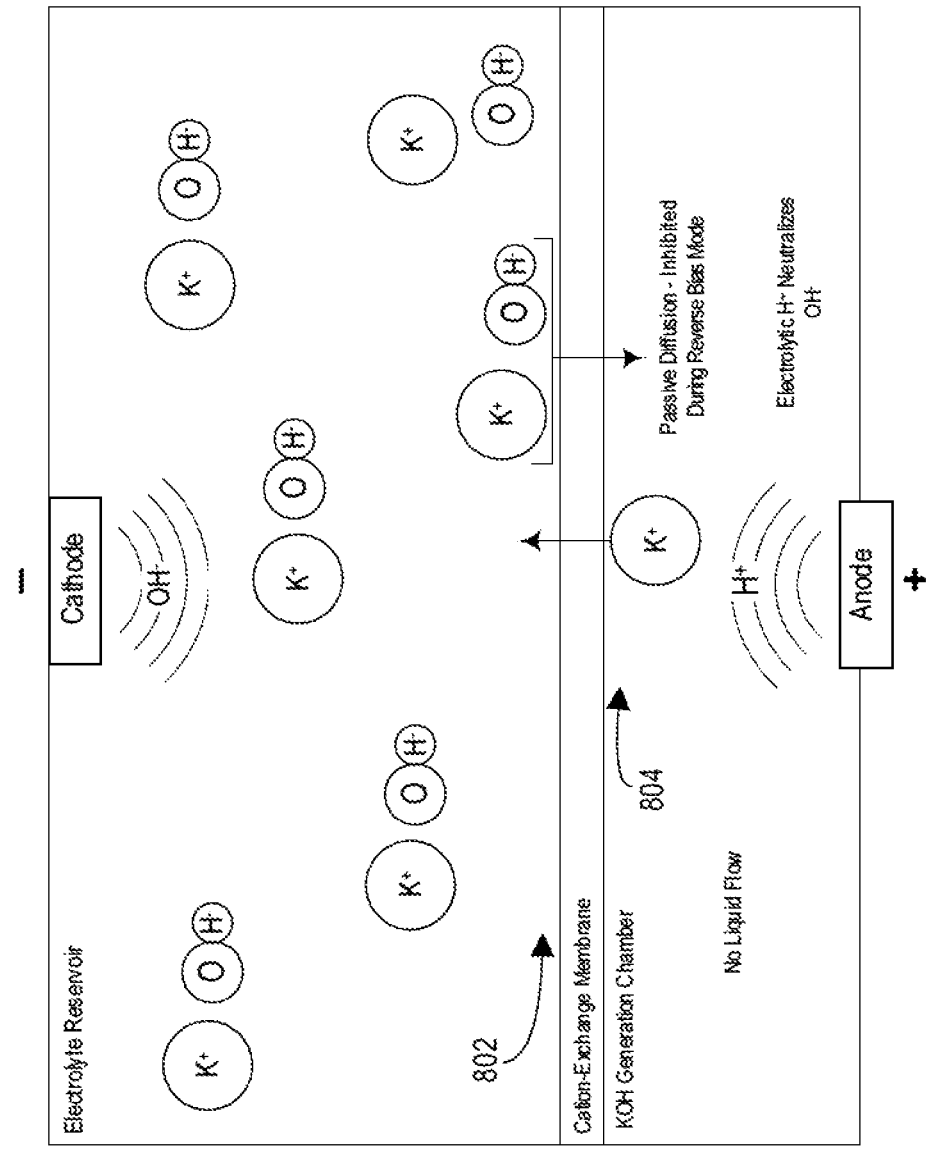
FIG. 3C illustrates a schematic flow diagram for an eluent generation systems or module in accordance with yet another embodiment of the present disclosure.

Illustratively, the KOH eluent generation component depicted in FIG. 3A can be switched or disposed in a reverse bias mode, as depicted in FIG. 3C, in which the anode (reservoir electrode) depicted in FIG. 3A serves or functions as a cathode and the cathode (chamber electrode) depicted in FIG. 3A serves or function as an anode. In this reverse bias configuration, the water splitting reaction at the chamber electrode—now anode—generates $H^+$ or $H_3O^+$ in the present embodiment. Passive diffusion of KOH from the electrolyte reservoir to the KOH generation chamber can occur because of the relatively large concentration differential between the KOH in the electrolyte reservoir (2-4 N) and the non-flowing deionized water in the KOH generation chamber. The generated hydronium ions can neutralize at least some, and preferably all of the $OH^-$ ions of the passively diffused KOH molecules to form $H_2O$ and then transfer the remaining $K^+$ ion to the membrane towards the cathode (to maintain charge balance). In a preferred embodiment, a suitable voltage can be selected to match the rate of ion diffusion with the rate of ion transport, thereby optimizing the form of the membrane. Accordingly, in certain embodiments, an equilibrium can be achieved between passive ion diffusion into the chamber and active reverse bias potential into the reservoir, such that little to no hydronium enters the membrane and no potassium exits the membrane (e.g., on either side).

In some embodiments, where the fluid in the eluent generation chamber is essentially deionized water that does not contain passively diffused KOH, the electrolytically generated hydronium can migrate to the membrane towards the cathode converting the membrane to the hydronium form and in the process ejecting $K^+$ into the electrolyte reservoir. Without being bound to any theory, each hydronium ion that enters the membrane stack causes a ($K^+$) species ion or electrolytically-generated ion (e.g., $H^+$ or $H_3O^+$) to exit the membrane stack into the reservoir (e.g., to achieve a charge and/or concentration balance).

It should also be noted that by transforming the ion exchange membrane into the hydronium form, ion exchange retention of potassium is possible when passive diffusion of KOH occurs on the membrane resulting in formation of water. The net effect of the reversed polarity is minimal transport of the KOH.

Thus, without being bound to any theory, the generation of an electric field can inhibit translocation of eluent and/or eluent counter ions through the membrane and/or into the chamber. In particular, generation of hydronium ions in the chamber can neutralize partly or all of the OH⁻ ions of the KOH that passively diffused from the electrolyte reservoir to the non-flowing generation chamber.

In some embodiments, the first electrode is in electrical communication with a liquid ion source disposed in an ion source reservoir at the first side of the ion exchange membrane, the eluent counter ions being disposed in the liquid ion source. The second electrode can likewise be in electrical communication with a liquid disposed in an eluent generation chamber at the second side of the ion exchange membrane. The applied voltage with the first polarity electrolytically generates a first electric field that promotes translocation of the eluent counter ions through the ion exchange membrane toward the second electrode. Similarly, the applied voltage with the second polarity electrolytically generates the second electric field that inhibits the eluent counter ions in the ion source reservoir from translocating through the ion exchange membrane.

As described above, the (normal operation) voltage having the first polarity can cause the first electrode to function as an anode and the second electrode to function as a cathode, while the (reverse bias) voltage having the second polarity causes the first electrode to function as a cathode and the second electrode to function as an anode. The foregoing configuration is applicable for eluent generation components corresponding or similar to those depicted in FIG. 2A and FIG. 3A where the eluent ion is negative (e.g. hydroxide) and the counter ion is positively charged (e.g., K⁺), they combine to form the eluent (e.g., KOH). In such embodiments, the electrolytically generated ions in the electrolyte reservoir can be or comprise positively-charged ions. For instance, the positively-charged ions can be or comprise H⁺ or hydronium ions.

Alternatively, the (normal operation) voltage having the first polarity can cause the first electrode to function as a cathode and the second electrode to function as an anode, while the (reverse bias) voltage having the second polarity causes the first electrode to function as an anode and the second electrode to function as a cathode. The foregoing configuration is applicable for eluent generation components corresponding or similar to those depicted in FIG. 2B where the eluent ion is positively charged (e.g. H⁺) and the counter ion is negatively charged (e.g., methanesulfonate; MSA⁻) that combine to form the eluent (e.g., methanesulfonic acid). In such embodiments, the electrolytically generated ions can be or comprise negatively-charged ions. For instance, the negatively-charged ions can be or comprise hydroxide ions.

As described above, the production of an electric field can prevent, reduce, inhibit, control, and/or regulate the translocation of eluent and/or species ions through the ion exchange membrane. By way of further explanation, the (reverse bias) voltage having the second polarity can be adjusted—increased or decreased. Just as increasing the (normal operation) voltage having the first polarity can increase the magnitude of the first electric field as known in the art, increasing an absolute magnitude of the (reverse bias) voltage can also increase the magnitude of the electric field, the amount of electrolytic ions capable of neutralizing passively diffused eluent molecules from the electrolyte reservoir to the generation chamber, and the amount of electrolytic ions capable of entering the ion exchange membrane from the generation chamber. In addition, increasing an absolute magnitude of the (reverse bias) voltage may improve the inhibition and reduce the amount of eluent that passively diffuses from the electrolyte reservoir to the generation chamber. Accordingly, certain embodiments can include adjusting—increasing and/or decreasing—the (normal operation) voltage having the first polarity and/or the (reverse bias) voltage having the second polarity (e.g., in order to control, regulate, increase, or decrease the electric field). Accordingly, certain embodiments can include adjusting the voltage having the second polarity so that a portion of the of the diffused eluent molecules that diffused from the electrolyte reservoir to the generation chamber are neutralized with electrolytically generated ion in the generation chamber where the portion may be 100%, at least 99%, at least 95%, at least 90%, at least 80%, at least 70%, at least 60%, at least 50% of the diffused eluent molecules.

Some embodiments can include a step of selectively reversing the polarity of the voltage from the second polarity to the first polarity. The (reverse bias) voltage having the second polarity can be applied during equipment down time, passive mode(s), transportation, delay mode(s), and so forth. The second polarity can be a standby voltage that could be invoked when the eluent generator cartridge is not being used to generate eluent. However, resuming back to the first normal polarity, the device can generate eluent. Such events can occur for brief or extended periods of time. Accordingly, some embodiments can include waiting a first period of time before selectively reversing the polarity of the voltage from the second polarity to the first polarity and/or waiting a first period of time between the step of selectively reversing the polarity of the voltage from the first polarity to a second polarity and the step of selectively reversing the polarity of the voltage from the second polarity to the first polarity. Some embodiments can further include another step of selectively reversing the polarity of the voltage from the first polarity to the second polarity.

In some cases, a large amount of electrolytic ions can be generated in the generation chamber during the reverse bias mode that converts the membrane to either the hydronium (for the case of KOH generator) or hydroxide form (for the case of MSA generator). Although this state is advantageous for the membrane in inhibiting translocation of eluent counter ions, upon startup or resuming normal polarity, the device can take a long time to stabilize the startup operation since the membrane needs to be regenerated from the hydronium or hydroxide state to being charged with eluent counter ions. This delay in system startup time can be reduced or avoided by optimizing the magnitude of the applied voltage and/or the duration of the applied voltage for a particular the membrane in an empirical manner, which can depend on whether the particular membrane has a relatively high or low ion exchange capacity. Another option is to selectively reverse the polarity when the eluent counter ions are detected close to the membrane electrode interface. One means of detection can be by electrical means by measuring the resistance across another pair of sensor electrodes in the generation chamber. The resistance would be high when no translocation species is detected but will become low when the eluent counter ions are detected. The polarity can be reversed once the species is detected to inhibit the transport of the species ions. Thus a reverse bias or polarity can be invoked when the device needs it for efficient operation. This type of approach would be useful when transporting the eluent generator cartridge and the device can be shipped with this automated reverse bias feature to facilitate fast startup upon installation or standby.

In at least one embodiment, a method of inhibiting translocation of eluent counter ions through an ion exchange membrane can comprise applying a voltage across a first electrode and a second electrode, the first electrode being disposed on a first side of an ion exchange membrane, the second electrode being disposed on a second side of the ion exchange membrane, the applied voltage generating an electric field that inhibits translocation of species ions through the ion exchange membrane from the first side to the second side. The voltage can have a polarity. The first electrode can be in electrical communication with a liquid ion source. The liquid ion source can be disposed in an ion source reservoir at the first side of the ion exchange membrane. The eluent counter ions can be disposed in the liquid ion source.

The second electrode can be in electrical communication with a liquid. The liquid can be disposed in an eluent generation chamber at the second side of the ion exchange membrane. The applied voltage (with the polarity) can generate an electric field that inhibits the eluent counter ions in the ion source reservoir from translocating through the ion exchange membrane. Accordingly, some embodiments can include providing or obtaining a source of species ions. Some embodiment can include providing or obtaining a first electrode and a second electrode. Some embodiment can include providing or obtaining an ion exchange membrane. The first and second electrodes can be disposed on opposite sides of the ion exchange membrane. Embodiments can further include selectively reversing the polarity of the voltage. The reversed polarity voltage can comprise a normal operational polarity voltage as known in the art. For instance, the reversed, normal operational polarity voltage applied across the first and second electrodes can electrolytically generate hydronium or hydroxide at the first side of the ion exchange membrane.

Some embodiments can include waiting a first period of time before selectively reversing the polarity of the voltage. The first period of time can be greater than or equal to about 1-60 minutes, 1-24 hours, 1-30 days, or any period of time or range of time disposed therebetween. For instance, the first period of time can be up to, greater than or equal to, or between about 1 hour, 2 hours, 4 hours, 8 hours, 12 hours, 16 hours, 24 hours, 36 hours, 48 hours, 60 hours, 72 hours, 84 hours, 90 hours, 96 hours, 108 hours, 120 hours, and so forth. In some embodiments, the waiting period of time can be the time required for the translocation of the species to a given sensor location. In some embodiments, the waiting period of time can be the time between the end of a work shift of the analyst and the beginning of a subsequent work shift (e.g. overnight, over a weekend, etc.). In some embodiments, the waiting period of time can be a period of time in which samples are not being analyzed.

In the normal operational mode, where eluent counter ions are transported through the ion exchange membrane under influence of an electric field, the eluent generation system or component can have a liquid flowing through the eluent generation chamber. Generated eluent (e.g., KOH, etc.) can be carried out of the eluent generation chamber by means of the aqueous fluid stream. The liquid stream containing eluent (i.e., the eluent stream) can flow to and/or through additional system components as known in the art.

In the reverse bias mode, where an electric field is generated to inhibit the flow of eluent counter ions into the generation chamber, the liquid flow can be stopped.

One or more embodiments can include initiating a flow of the aqueous fluid through the eluent generation chamber. The initiated flow can be any flow rate suitable for the eluent generation chamber (or cartridge). Illustratively, the flow rate can be between about 0.05 µl/min and about 10 ml/min, preferably between about 0.5 µl/min and about 5 ml/min, more preferably between about 0.5 ml/min and about 2 ml/min.

Certain embodiments can include selectively reversing the polarity of the voltage from the first (reverse bias) polarity to a second (normal) polarity. The voltage with the second polarity can generate an electric field (e.g., a second electric field) that promotes translocation of the species ions through the membrane from the first side to the second side.

One or more embodiments can include initiating a startup procedure, illustratively an automatic startup procedure. The (automatic) startup procedure can occur over a second period of time. Illustratively, the second period of time can be from less than 1 minute to greater than or equal to about 30 minutes in various embodiments. One or more embodiments can include initiating an equilibration procedure, illustratively an automatic equilibration procedure. The (automatic) equilibration can occur over a third period of time. Illustratively, the third period of time can be less than or equal to about 60 minutes, preferably less than or equal to about 45 minutes, more preferably less than or equal to about 30 minutes, still more preferably less than or equal to about 15 minutes, still more preferably less than or equal to about 10 minutes. Accordingly, one or more embodiments can include equilibrating the eluent generation module over a (third) period of time. The (third) period of time can be less than or equal to about 60 minutes, preferably less than or equal to about 45 minutes, more preferably less than or equal to about 30 minutes, still more preferably less than or equal to about 15 minutes, still more preferably less than or equal to about 10 minutes.

In some embodiments, the reverse bias of the present disclosure can provide a significant reduction in system startup and/or equilibration time. For instance, at least one standard analyte detection system and/or eluent generation module thereof can require a substantial amount of time and aqueous fluid to equilibrate the system and/or components thereof (e.g., prior to injection of analyte ions to be identified and/or quantified). Standard equipment startup times can be between 1 minute and 10 minutes, typically about 5 minutes. Where pre-startup down time was for an extended period, such as between 16 hours and 90 hours, or more, a high concentration ion plug disposed in the eluent generation chamber may transit system components during startup. Additional equilibration time can be required in order to achieve a suitable baseline measurement for one or more parameters, such as conductivity, in the aqueous fluid (eluent) stream, prior to injection of analyte ions into the system. In some embodiments, the suitable baseline measurement comprises a conductivity less than or equal to 0.25, 0.2, 0.19, 0.18, 0.175, 0.17, 0.165, 0.16, 0.155, 0.15, 0.145, 0.14, 0.135, or less (µS/cm).

Achieving the suitable baseline measurement after transit of a high concentration ion plug may require flushing or sweeping the system components with aqueous fluid at a suitable flow rate for a suitable period of time or volume. For instance, suitable flow rates can depend on the size and/or volume of one or more system components—e.g., column size, loop size, line/tubing size, etc. Illustratively, suitable flow rates of typical systems can be between about 0.005 ml/min and about 5 ml/min, preferably between about 0.01 ml/min and about 1 ml/min. For instance, in some embodiments, suitable flow rates for a 2 mm internal diameter column can be, preferably, between about 0.15 ml/min and about 0.5 ml/min, still more preferably between about 0.2 ml/min and about 0.4 ml/min, still more preferably between about 0.25 ml/min and about 0.35 ml/min, still more preferably about 0.3 ml/min. In some embodiments, suitable flow rates for a 4 mm internal diameter column can be, preferably, about 1 ml/min, more preferably about 1.5 ml/min. In some embodiments, suitable flow rates for a capillary column can be, preferably, about 0.01 ml/min. Accordingly, suitable flow rates may vary depending on the size and/or configuration of the system and/or component(s). Under suitable conditions, the equilibration time required to reach a suitable baseline after transit of a high concentration ion plug can be greater than or equal to about 10 minutes, 15 minutes, 20 minutes, 30 minutes, 45 minutes, 60 minutes, 90 minutes, 120 minutes, 150 minutes, 180 minutes, 210 minutes, 240 minutes, 270 minutes, 285 minutes, 300 minutes, 315 minutes, 330 minutes, 360 minutes, 390 minutes, 405 minutes, or more.

Unlike standard down time, passive modes—where the electrical components and/or fluid flow are inactive, embodiments of the present disclosure can include a reverse voltage bias mode in which the normal polarity of the voltage during system operation is reversed during down time. In at least some embodiments, during reverse voltage bias mode operation, the flow of liquid through the eluent generation chamber can be stopped. Following a similar extended period (e.g., between about 16 hours to 90 hours, or more), under similar startup and operation parameters, embodiments of the present disclosure can decrease system equilibration times by at least 10%, 15%, 20%, 25%, 30%, 35%, 40%, 45%, 50%, 55%, 60%, 70%, 75%, 80%, 85%, 90%, 95%, 96%, 97%, 98%, 98.5%, or 99%. For instance, embodiments of the present disclosure can require less than or equal to about 400 minutes, 300 minutes, 200 minutes, 100 minutes, 90 minutes, 60 minutes, 55 minutes, 50 minutes, 45 minutes, 40 minutes, 35 minutes, 30 minutes, 25 minutes, 20 minutes, 15 minutes, 12 minutes, 10 minutes, 9 minutes, 8 minutes, 7 minutes, 6 minutes, 5 minutes, 4 minutes, 3 minutes, 2 minutes, or 1 minute, or less, of additional system equilibration time (over the normal system startup time). At least one embodiment can enable a reduced system startup time of between about 1 minute and about 60 minutes, preferably between about 2 minutes and about 20 minutes, more preferably between about 3 minutes and about 45 minutes, still more preferably between about 4 minutes and about 30 minutes, still more preferably between about 5 minutes and about 20 minutes. Such time savings result in significant operational and labor cost savings, such as reagent (aqueous fluid or water) costs, electricity costs, personnel costs, and so forth.

Some embodiments can include a system for inhibiting translocation of species ions through an ion exchange membrane. The system can include a first electrode and a second electrode. The first electrode can be in electrical communication with an ion source, such as a liquid ion source. The ion source can be disposed in an ion source reservoir. The ion source can contain species ions (or eluent counter ions). The second electrode can be in electrical communication with a liquid. The liquid disposed in and/or flowing through an eluent generation chamber.

Embodiments can include an ion exchange membrane. The first electrode can be disposed on a first side of the membrane. The second electrode can be disposed on a second (e.g., opposite) side of the membrane. For instance, the membrane can be disposed between the ion source reservoir and the eluent generation chamber in some embodiments. The membrane can be selectively permeable to a type of ion—anions or cations, for example. As understood by those skilled in the art, the membrane can substantially prevent liquid flow (therethrough) while providing an ion transport bridge. For instance, the membrane can be structurally configured to substantially prevent liquid flow therethrough. As used herein, "substantially preventing liquid flow" means that the membrane permits, or is configured to permit, liquid flow therethrough at a rate of less than or equal to 1%, preferably less than or equal to 0.1% of the intended operating range of flow rate value(s), or range thereof (e.g., between 0.5 µl/min and 5 ml/min). Those skilled in the art can select the particular membrane specification suitable for their intended use.

As described above, when a (normal operation) voltage having a first polarity is applied across the first and second electrodes, a first electric field is generated and the eluent counter ions (in the ion source) are driven through the ion exchange membrane (into the liquid). Similarly, when a reverse bias voltage having a second polarity is applied across the first and second electrodes, a second electric field is generated and eluent counter ions are inhibited from being driven through the ion exchange membrane (into the liquid).

Embodiments can also include means for reversing the polarity of the voltage across the first and second electrodes. Means for reversing the polarity of the voltage across the first and second electrodes can include a switch, such as a polarity-reversing switch. The switch can comprise a single pole, double throw (SPDT) switch, a double pole, double throw (DPDT) switch, a DPDT rocker switch, or other switch, as known in the art. In some embodiments, the means for reversing the polarity of the voltage can be disposed as a part of the eluent generator. The switch, for example, can be part of the eluent generator. In other embodiments, the switch can be disposed at another suitable location or component, such as a circuit board, power source, etc.

Some embodiments can include a system in an active mode or in an idle mode. Some embodiments can include a voltage applied across the first and second electrodes. As described above, the voltage can have a polarity. The polarity of the voltage can be a first (normal operational) polarity voltage or a second (reverse bias and/or passive mode) polarity voltage. The voltage having the first polarity can be actively generating hydroxide or hydronium ions (e.g., at the first electrode) in the active, normal operational mode. The voltage having the second polarity can be actively generating one of the water splitting ions, which are hydroxide and hydronium ions, (e.g., at the second electrode) in the reverse bias mode. The voltage range for the reversed bias polarity (in terms of absolute values) can be <3V, more preferably <2 V and most preferably <1.5 V. The voltage can be applied by a DC power supply or an alternating current power supply. The voltage can be switched or pulsed as needed to facilitate the inhibition of the translocation of the species ions as described in the present invention. It is also possible to operate the device in the constant current or power mode. The current range for the reversed bias polarity (in terms of absolute values) can be <2 milliamperes, more preferably <700 microampres, and most preferably <200 microampres. The normal and reversed bias mode of operation could be operated with independent power supplies. Under certain circumstances where a significant amount of eluent has not passively diffused through the ion exchange barrier, the applied voltage can be replaced with an applied current and still be suitable for decreasing the background signal.

At least one embodiment includes a method of shipping or transporting an eluent generator. The method can comprise transporting the eluent generator from a first site to a second site. As used herein, a "site" may include a facility, building, room, or any location. Illustratively, the first site or second site can be or comprise a manufacturing site, a storage site, a wholesale or retail site, a receiving site, a user or operator site, etc. In at least one embodiment, the eluent generator can be transported from the first site to the second site while a voltage having a polarity is applied across the eluent generator. For instance, a battery can be electrically coupled to the eluent generator such that the battery applies (or is configured to apply) a voltage having a polarity, the voltage having the polarity inhibiting translocation of eluent through a barrier of the eluent generator. In some embodiments, the eluent generator can comprise: a first electrode in electrical communication with a liquid ion source disposed in an ion source reservoir, the liquid ion source containing species ions; a second electrode in electrical communication with a liquid disposed in an eluent generation chamber; and an ion exchange barrier disposed between the ion source reservoir and the eluent generation chamber. A battery can be electrically coupled to the first electrode and to the second electrode such that the battery applies (or is configured to apply) the voltage having the polarity. With the voltage having the polarity applied across the first and second electrodes, the eluent in the ion source is/are inhibited from translocating through the ion exchange barrier into the liquid.

Illustratively, an embodiment can include a method of shipping an eluent generator, the eluent generator comprising: a first electrode in electrical communication with a liquid ion source disposed in an ion source reservoir, the liquid ion source containing species ions; a second electrode in electrical communication with a liquid (e.g., water or deionized water) disposed in an eluent generation chamber; and an ion exchange barrier disposed between the ion source reservoir and the eluent generation chamber such that when a voltage having a first polarity is applied across the first and second electrodes the eluent counter ions in the ion source are driven through the ion exchange barrier into the liquid, and when a voltage having a second polarity is applied across the first and second electrodes the eluent in the ion source are inhibited from translocating through the ion exchange barrier into the liquid, a battery being electrically coupled to the first electrode and the second electrode, in which the battery is configured to apply the voltage having the second polarity, the method comprising transporting the eluent generator from a manufacturing site to a receiving site.

Any prior art eluent generator system can benefit from the present invention. While the examples here discuss one format of eluent generation, multiple channel devices of the prior art that pursue functions that include eluent generation with source reagents would benefit from the polarity reversal.

Those skilled in the art will appreciate that voltage is merely one measurement for electrical systems, circuits, etc. It is noted that alternative measurements, such as electric or electrical potential, current, electromotive force, and so forth, are also contemplated herein. Accordingly, embodiments of the present disclosure can alternatively include reversing an electric or electrical potential, current, electromotive force, and so forth.

EXAMPLES

The examples disclosed herein are intended to provide support for various embodiments of the present disclosure. Subject matter disclosed in one example may relate to any suitable embodiment of the present disclosure and is not necessarily limited to the specific example in which it is presented.

Example 1

Existing eluent generation systems require a large amount of time to re-start the system after a period of system down time (e.g., powered down, etc.) in order to reach a suitable baseline. Specifically, eluent counter or species ions passively diffuse through the membrane of the eluent generation component. Over time, the concentration of ions in the eluent generation chamber becomes substantially higher than the concentration of eluent ions in the aqueous fluid, eluent stream during normal operation. The large concentration of ions in the fluid stream may need to be swept or flushed from the system plumbing components (e.g., lines, valves, etc.) before the system can be operated at optimal levels. Sweeping or flushing the plumbing components of the system can be time-consuming and require additional monitoring by operation personnel or users. The issue is worse when the system equilibration flow rate is low.

Alternatively, or in addition, the analytical or concentrator column may require additional equilibration time to reach a steady, low, baseline reading (e.g., if the high ion concentration plug transits through the column during or after system start up procedures). The equilibration time may be required to achieve optimal system performance. For instance, the baseline reading may need to be reached before analyte ions can be injected onto the column to ensure optimal or suitable levels of analyte ion recovery, identification, quantification, etc. Column equilibration may also be affected in other ways. Alternatively, or in addition, the capacity of the ion suppressor (in line downstream of the eluent generator) can be exhausted by the high ion concentration plug, requiring additional time for regeneration of the suppressor. Overall, the impact of the high concentration plug includes added system equilibration time needed for optimal chromatographic operation. This additional time translates into additional labor and operation costs.

Figure 4:
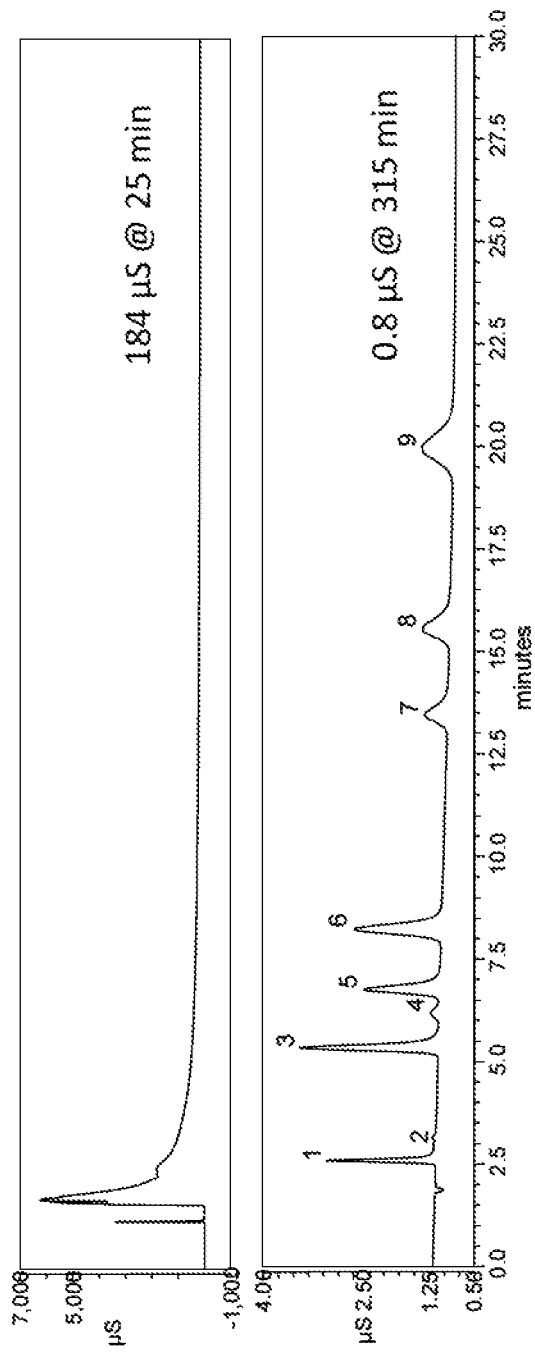
FIG. 4 illustrates exemplary performance of a standard eluent generator.

FIG. 4 illustrates an example of an eluent generator performance after a 16 hour period of system down time (i.e., no voltage applied, no fluid flow, etc.). Depicted is a chromatogram after a first sample injection (30 minute run time per injection) upon system restart that illustrated a relatively large background of 184 μS at the end of run (see upper chromatogram of FIG. 4). Under an operating set-up (2 mm column, 29 mA current, 0.3 ml/min flow rate, 38 mM KOH eluent, 2.5 ul loop size, 30° C.), the system continued to run for about 5 hours in order to equilibrate and achieve a CD background below 1 μS/cm (see lower chromatogram of FIG. 4). The illustrated peaks are as follows: 1. Fluoride, 2. Acetate, 3. Chloride, 4. Carbonate, 5. Nitrite, 6. Sulfate, 7. Bromide, 8. Nitrate, 9. Phosphate. The peak recovery of chloride was not optimal under these conditions, as compared to a no-down time control since the suppressor capacity was depleted due to the large concentration of the eluent that traveled through the suppressor upon startup.

Example 2

Table 1 displays a series of current and voltage settings for a reverse bias configuration of a first eluent generator component. As illustrated in Table 1, a voltage of 2.1 V was applied (in the reverse bias polarity—140 μA current was measured) that produced or resulted in the lowest conductivity—0.137 μS/cm—of the tested settings. This setting inhibited the transport of the species ions as evident from the low background.

TABLE 1

| Current (μA) | Voltage (V) | Conductivity (μS/cm) |
|---|---|---|
| 0 |  | 28 |
| 2 | 0.5 | 2.80 |
| 6 | 0.8 | 1.70 |
| 35 | 1.8 | 0.226 |
| 64 | 1.95 | 0.172 |
| 81 | 2.04 | 0.147 |
| 140 | 2.1 | 0.137 |
| 270 | 2.43 | 0.142 |
| 312 | 2.90 | 0.143 |

Example 3

Figure 5:
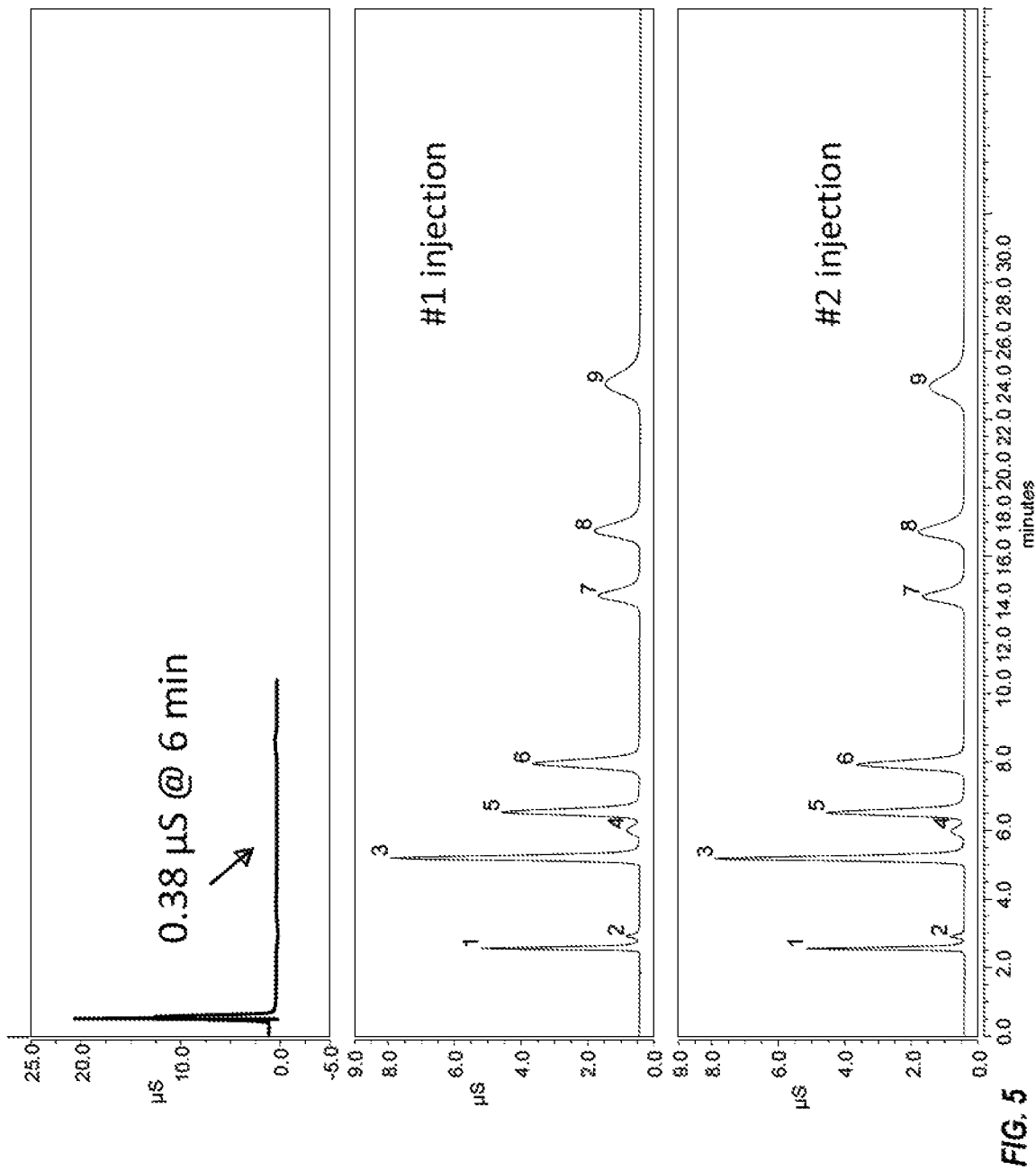
FIG. 5 illustrates exemplary performance of an eluent generator system in accordance with an embodiment of the present disclosure.

FIG. 5 illustrates measurements obtained under the normal operating parameters of Example 1 after a 16 hour period of an applied reverse bias passive mode polarity voltage of 2.1 V for the first eluent generator component. As depicted in FIG. 5 (upper chromatogram where no sample was injected), background conductivity reached 0.38 μS/cm after only 6 minutes following 16 hours of passive, reverse bias down time. Furthermore, peaks were substantially improved in shape and size, indicating a substantial increase in analyte recovery, as illustrated by the subsequent chromatograms with two separate sample injections (see middle and lower chromatograms of FIG. 5). These surprising and unexpected results indicate that a reverse bias polarity voltage applied during a 16 hour passive mode or down times (e.g., with no aqueous fluid flow) provides a substantial reduction in startup, equilibration time and a substantial improvement in analyte peaks area, indicating a substantial increase in analyte recovery.

Example 4

Table 2 displays retention times and peak areas for common analytes for a no-down time control and 16 hour period of an applied reverse bias passive mode polarity voltage of 2.1 V. As illustrated in Table 2, retention times and analyte peak areas an substantially similar for two separate injections following a 16 hour period of the applied reverse bias passive mode polarity voltage of 2.1 V as for the no-down time control.

TABLE 2

|  | Control | | Injection after 16 hrs system shutdown (reverse bias 2.1 V) | | | |
|---|---|---|---|---|---|---|
|  | | | Injection #1 | | Injection #2 | |
| Analyte | Retention Time | Area | Retention Time | Area | Retention Time | Area |
| F | 2.56 | 0.4416 | 2.57 | 0.4446 | 2.567 | 0.4411 |
| Cl | 5.197 | 1.2655 | 5.223 | 1.2199 | 5.2 | 1.2635 |
| $NO_2$ | 6.543 | 0.8831 | 6.577 | 0.8719 | 6.54 | 0.88 |
| $SO_4$ | 7.947 | 0.9205 | 8.06 | 0.9188 | 7.957 | 0.9186 |
| Br | 12.883 | 0.524 | 12.927 | 0.5274 | 12.853 | 0.5219 |
| $NO_3$ | 14.79 | 0.6784 | 14.833 | 0.676 | 14.747 | 0.6767 |
| $PO_4$ | 19.027 | 0.7894 | 19.36 | 0.7787 | 19.03 | 0.7846 |

These surprising and unexpected results indicate that a reverse bias polarity voltage applied during passive mode(s) or down times (e.g., with no aqueous fluid flow) produces results similar results as constant operation of the system without any down time. Overall these results translate into productivity for the user since the instrument starts up with no or minimal time lost.

Example 5

Figure 6:
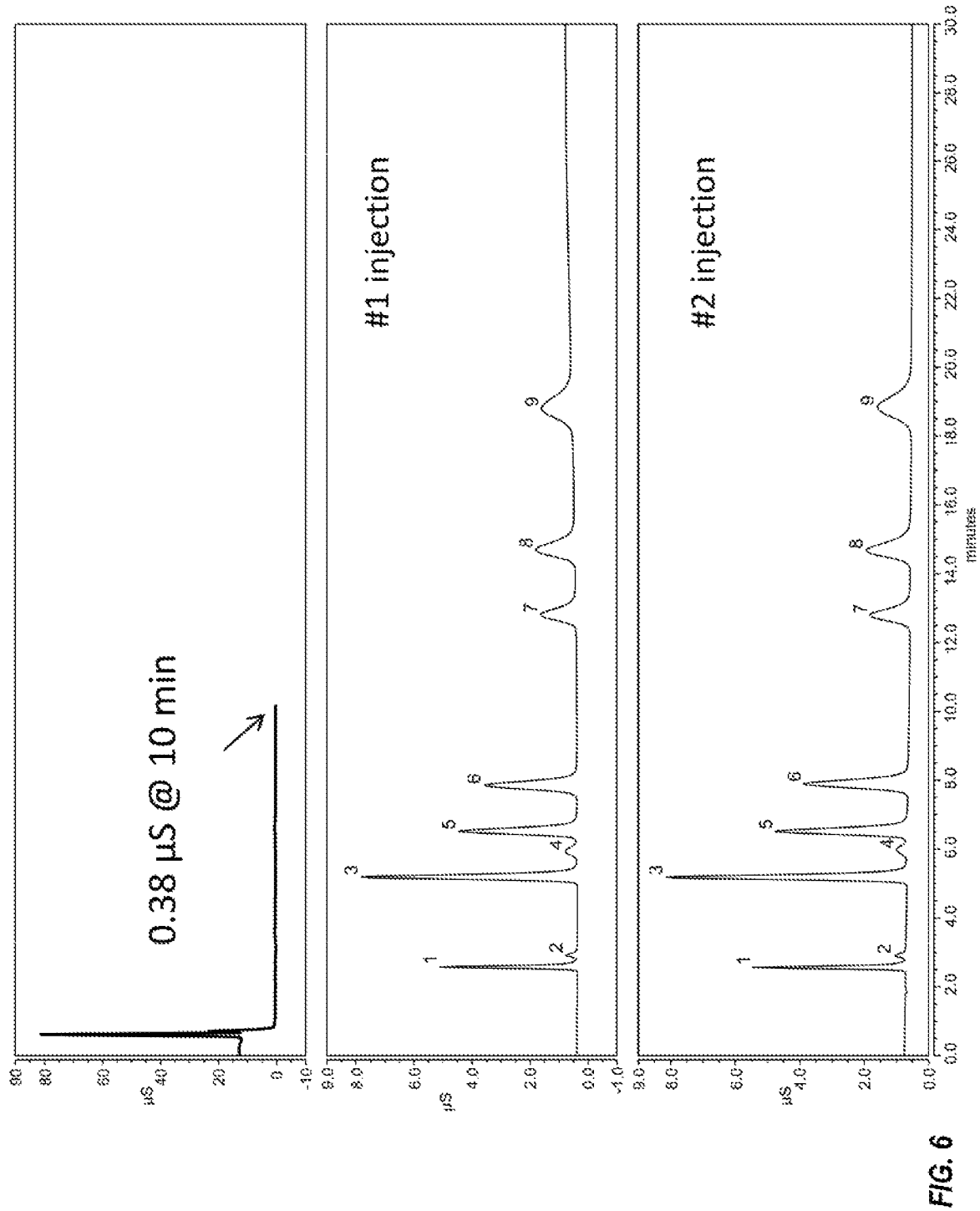
FIG. 6 illustrates exemplary performance of an eluent generator system in accordance with another embodiment of the present disclosure.

FIG. 6 illustrates measurements obtained under the normal operating parameters of Example 1 after a 90 hour period of an applied reverse bias passive mode polarity voltage of 2.1 V for the first eluent generator component. As depicted in FIG. 6, background conductivity reached 0.38 μS/cm after only 10 minutes following 90 hours of passive, reverse bias down time (upper chromatogram where no sample was injected). Furthermore, peaks were substantially improved in shape and size, indicating a substantial increase in analyte recovery, as illustrated by the subsequent chromatograms with two separate sample injections (see middle and lower chromatograms of FIG. 6). These surprising and unexpected results indicate that a reverse bias polarity voltage applied during a 90 hour passive mode or down times (e.g., with no aqueous fluid flow) provides a substantial reduction in startup, equilibration time and a substantial improvement in analyte peaks area, indicating a substantial increase in analyte recovery.

Example 6

Table 3 displays retention times and peak areas for common analytes for a no-down time control and 90 hour period of an applied reverse bias passive mode polarity voltage of 2.1 V for the first eluent generator component. As illustrated in Table 3, retention times and analyte peak areas an substantially similar for two separate injections following a 90 hour period of the applied reverse bias passive mode polarity voltage of 2.1 V as for the no-down time control.

TABLE 3

|  | Control | | Injection after 90 hrs system shutdown (reverse bias 2.1 V) | | | |
|---|---|---|---|---|---|---|
|  | | | Injection #1 | | Injection #2 | |
| Analyte | Retention Time | Area | Retention Time | Area | Retention Time | Area |
| F | 2.56 | 0.4399 | 2.573 | 0.4359 | 2.563 | 0.4414 |
| Cl | 5.18 | 1.26 | 5.187 | 1.2502 | 5.183 | 1.2607 |
| $NO_2$ | 6.517 | 0.8817 | 6.52 | 0.8687 | 6.517 | 0.882 |
| $SO_4$ | 7.9 | 0.9109 | 7.853 | 0.8955 | 7.893 | 0.9122 |
| Br | 12.807 | 0.5147 | 12.81 | 0.508 | 12.797 | 0.5173 |
| $NO_3$ | 14.693 | 0.6709 | 14.693 | 0.6727 | 14.677 | 0.675 |
| $PO_4$ | 18.857 | 0.7892 | 18.81 | 0.7925 | 18.827 | 0.7903 |

These surprising and unexpected results indicate that a reverse bias polarity voltage applied during passive mode(s) or down times (e.g., with no aqueous fluid flow) produces results similar results as constant operation of the system without any down time.

Example 7

Table 4 displays a series of current and voltage settings for a reverse bias configuration of a second eluent generator component (a different unit made in the same way as the first eluent generator component). As illustrated in Table 4, a voltage of 2.35 V was applied (in the reverse bias polarity—

670 μA current was measured) that produced or resulted in the lowest conductivity—0.17 μS/cm—of the tested settings.

TABLE 4

| Current (μA) | Voltage (V) | Conductivity (μS/cm) |
|---|---|---|
| 0 | | 25 |
| 2 | 0.3 | 16.5 |
| 35 | 1.36 | 4.20 |
| 62 | 1.79 | 1.40 |
| 81 | 2.01 | 0.60 |
| 138 | 2.16 | 0.24 |
| 670 | 2.35 | 0.17 |
| 1170 | 2.53 | 0.18 |
| 1970 | 2.9 | 0.26 |

Example 8

Figure 7:
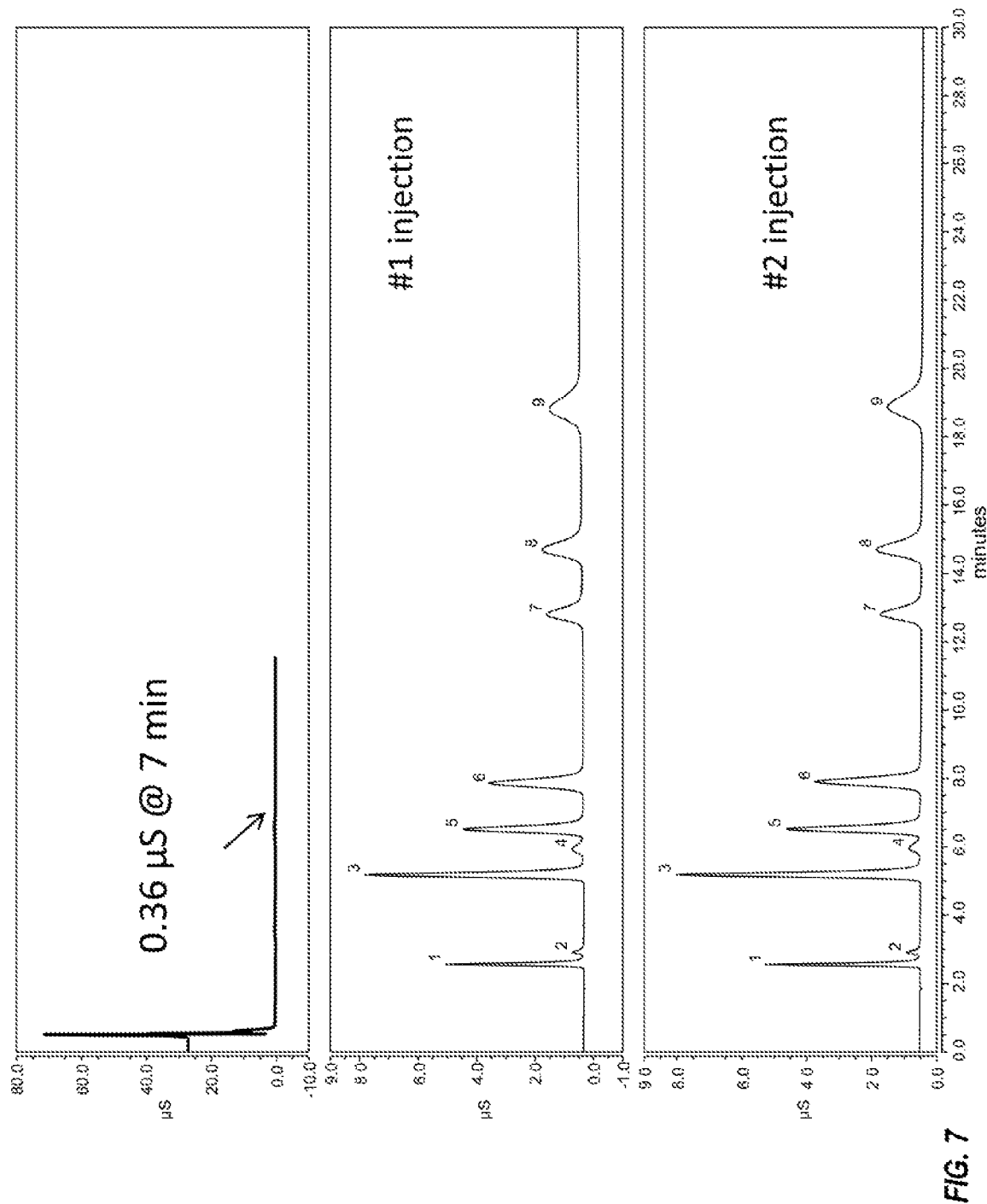
FIG. 7 illustrates exemplary performance of an eluent generator system in accordance with yet another embodiment of the present disclosure.

FIG. 7 illustrates measurements obtained under the normal operating parameters of Example 1 after a 16 hour period of an applied reverse bias passive mode polarity voltage of 2.35 V for the second eluent generator component. As depicted in FIG. 7 (upper chromatogram where no sample was injected), background conductivity reached 0.36 μS/cm after only 7 minutes following 16 hours of passive, reverse bias down time. Furthermore, peaks were substantially improved in shape and size, indicating a substantial increase in analyte recovery, as illustrated by the subsequent chromatograms with two separate sample injections (see middle and lower chromatograms of FIG. 7). These surprising and unexpected results indicate that a reverse bias polarity voltage applied during a 16 hour passive mode or down times (e.g., with no aqueous fluid flow) provides a substantial reduction in startup, equilibration time and a substantial improvement in analyte peaks area, indicating a substantial increase in analyte recovery.

Example 9

Table 5 displays retention times and peak areas for common analytes for a no-down time control and 16 hour period of an applied reverse bias passive mode polarity voltage of 2.35 V for the second eluent generator component. As illustrated in Table 5, retention times and analyte peak areas are substantially similar for two separate injections following a 16 hour period of the applied reverse bias passive mode polarity voltage of 2.35 V as for the no-down time control.

TABLE 5

| | | Injection after 16 hrs system shutdown (reverse bias 2.35 V) | | | |
|---|---|---|---|---|---|
| | Control | Injection #1 | | Injection #2 | |
| Analyte | Retention Time | Area | Retention Time | Area | Retention Time | Area |
| F | 2.563 | 0.4389 | 2.567 | 0.4374 | 2.56 | 0.4395 |
| Cl | 5.19 | 1.2572 | 5.177 | 1.2496 | 5.18 | 1.2573 |
| $NO_2$ | 6.527 | 0.8791 | 6.51 | 0.8796 | 6.517 | 0.88 |
| $SO_4$ | 7.92 | 0.9086 | 7.863 | 0.9 | 7.903 | 0.9097 |
| Br | 12.823 | 0.5149 | 12.803 | 0.5095 | 12.807 | 0.5152 |
| $NO_3$ | 14.713 | 0.6737 | 14.69 | 0.6662 | 14.693 | 0.674 |
| $PO_4$ | 18.91 | 0.7824 | 18.813 | 0.7842 | 18.867 | 0.7834 |

These surprising and unexpected results indicate that a reverse bias polarity voltage applied during passive mode(s) or down times (e.g., with no aqueous fluid flow) produces results similar results as constant operation of the system without any down time.

Example 10

Table 6 displays a series of current and voltage settings for a reverse bias configuration of a third eluent generator component (a different unit from the first and second eluent generator components, but made in the same way). As illustrated in Table 6, a voltage of 2.24 V was applied (in the reverse bias polarity—136 μA current was measured) that produced or resulted in the lowest conductivity—0.144 μS/cm—of the tested settings.

TABLE 6

| Current (μA) | Voltage (V) | Conductivity (μS/cm) |
|---|---|---|
| 0 | | 16 |
| 2 | 0.1 | 2.7 |
| 37 | 1.8 | 0.55 |
| 88 | 2.0 | 0.198 |
| 136 | 2.24 | 0.144 |
| 240 | 2.8 | 0.224 |
| 385 | 3.1 | 0.313 |

Example 11

Figure 8:
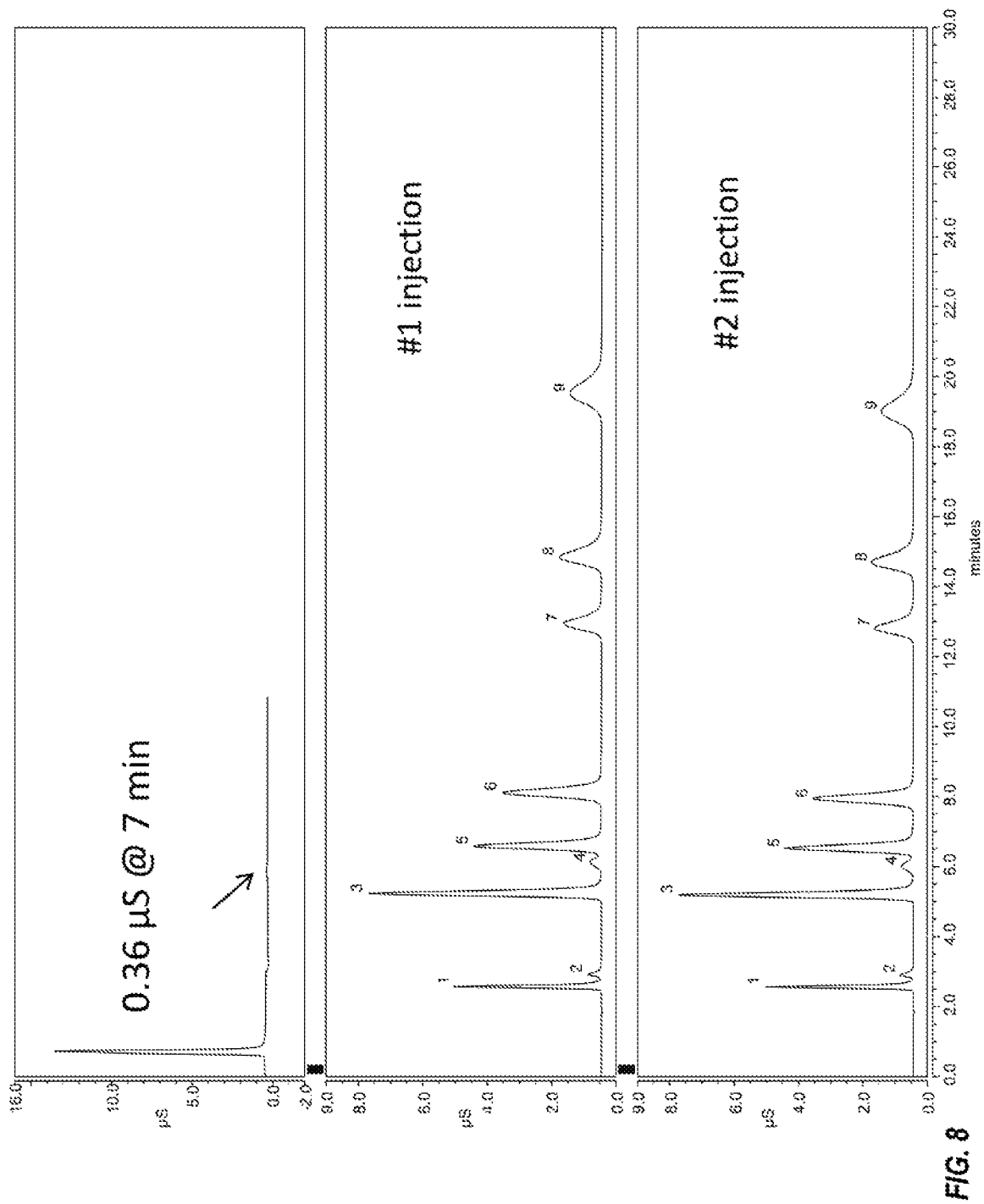
FIG. 8 illustrates exemplary performance of an eluent generator system in accordance with still another embodiment of the present disclosure.

FIG. 8 illustrates measurements obtained under the normal operating parameters of Example 1 after a 16 hour period of an applied reverse bias passive mode polarity voltage of 2.24 V for the third eluent generator component. As depicted in FIG. 8 (upper chromatogram where no sample was injected), background conductivity reached 0.36 μS/cm after only 7 minutes following 16 hours of passive, reverse bias down time. Furthermore, peaks were substantially improved in shape and size, indicating a substantial increase in analyte recovery, as illustrated by the subsequent chromatograms with two separate sample injections (see middle and lower chromatograms of FIG. 8). These surprising and unexpected results indicate that a reverse bias polarity voltage applied during a 16 hour passive mode or down times (e.g., with no aqueous fluid flow) provides a substantial reduction in startup, equilibration time and a substantial improvement in analyte peaks area, indicating a substantial increase in analyte recovery.

Example 12

Table 7 displays retention times and peak areas for common analytes for a no-down time control and 16 hour period of an applied reverse bias passive mode polarity voltage of 2.24 V for the third eluent generator component. As illustrated in Table 7, retention times and analyte peak areas an substantially similar for two separate injections following a 16 hour period of the applied reverse bias passive mode polarity voltage of 2.24 V as for the no-down time control.

TABLE 7

| Ana-lyte | Control | | Injection after 16 hrs system shutdown (reverse bias 2.24 V) | | | |
| --- | --- | --- | --- | --- | --- | --- |
| | | | Injection #1 | | Injection #2 | |
| | Retention Time | Area | Retention Time | Area | Retention Time | Area |
| F | 2.563 | 0.4306 | 2.573 | 0.4311 | 2.567 | 0.4301 |
| Cl | 5.183 | 1.2437 | 5.233 | 1.2361 | 5.19 | 1.2401 |
| $NO_2$ | 6.52 | 0.8548 | 6.587 | 0.8395 | 6.527 | 0.8521 |
| $SO_4$ | 7.913 | 0.8946 | 8.11 | 0.8891 | 7.947 | 0.8919 |
| Br | 12.807 | 0.4997 | 12.94 | 0.4987 | 12.817 | 0.4974 |
| $NO_3$ | 14.69 | 0.6563 | 14.843 | 0.6543 | 14.7 | 0.6545 |
| $PO_4$ | 18.893 | 0.7587 | 19.457 | 0.7539 | 18.99 | 0.7566 |

These surprising and unexpected results indicate that a reverse bias polarity voltage applied during passive mode(s) or down times (e.g., with no aqueous fluid flow) produces results similar results as constant operation of the system without any down time.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The foregoing detailed description makes reference to specific exemplary embodiments. However, it will be appreciated that various modifications and changes can be made without departing from the scope contemplated herein and as set forth in the appended claims. More specifically, while illustrative exemplary embodiments in this disclosure have been more particularly described, the present disclosure is not limited to these embodiments, but includes any and all embodiments having modifications, omissions, combinations (e.g., of aspects across various embodiments), adaptations and/or alterations as would be appreciated by those in the art based on the foregoing detailed description.

Alterations and further modifications of the inventive features illustrated herein, and additional applications of the principles illustrated herein, which would occur to one skilled in the relevant art and having possession of this disclosure, are to be considered within the scope of this disclosure. Unless a feature is described as requiring another feature in combination therewith, any feature herein may be combined with another feature of a same or different embodiment disclosed herein. Furthermore, various well-known aspects of illustrative systems, methods, apparatus, and the like are not described herein in particular detail in order to avoid obscuring aspects of the example embodiments.

The limitations in the claims are to be interpreted broadly based on the language employed in the claims and not limited to examples described in the foregoing detailed description, which examples are to be construed as non-exclusive. Moreover, any steps recited in any method or process described herein and/or recited in the claims may be executed in any order and are not necessarily limited to the order presented in the claims, unless otherwise stated (explicitly or implicitly) in the claims. Accordingly, the scope of the invention should be determined solely by the appended claims and their legal equivalents, rather than by the descriptions and examples given above.

It will also be appreciated that various features, members, elements, parts, and/or portions of certain embodiments of the present invention are compatible with and/or can be combined with, included in, and/or incorporated into other embodiments of the present invention. Thus, disclosure of certain features, members, elements, parts, and/or portions relative to a specific embodiment of the present invention should not be construed as limiting application or inclusion of said features, members, elements, parts, and/or portions to the specific embodiment. Rather, it will be appreciated that other embodiments can also include said features, members, elements, parts, and/or portions without necessarily departing from the scope of the present invention. Likewise, certain embodiments can include fewer features than those disclosed in specific examples without necessarily departing from the scope of this disclosure.

In addition, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of inhibiting translocation of an eluent through an ion exchange barrier of an ion exchange chromatography system, the method comprising:
   applying a voltage or current across a first electrode and a second electrode, the voltage or current having a first polarity, the first electrode being disposed on a first side of the ion exchange barrier, the second electrode being disposed on a second side of the ion exchange barrier, the applied voltage or current with the first polarity electrolytically generating eluent ions at the second electrode and to generate a first electric field to promote the translocation of eluent counter ions through the ion exchange barrier from the first side to the second side, wherein the eluent counter ions and the eluent ions combine to form the eluent;
   selectively reversing a polarity of the voltage or current from the first polarity to a second polarity to generate a second electric field that inhibits translocation of the eluent through the ion exchange barrier from the first side to the second side; and
   selectively reversing the polarity of the voltage or current from the second polarity to the first polarity.

2. The method of claim 1, wherein the first electrode is in electrical communication with a liquid ion source disposed in an ion source reservoir, the first electrode is disposed in the ion source reservoir, the ion source reservoir is at the first side of the ion exchange barrier, the eluent counter ions being disposed in the liquid ion source, the second electrode being in electrical communication with a liquid disposed in an eluent generation chamber, the second electrode is disposed in the eluent generation chamber, the eluent generation chamber is at the second side of the ion exchange barrier, the applied voltage or current with the first polarity generating the first electric field to promote the translocation of the counter ions from the ion source reservoir through the ion exchange barrier toward the second electrode and to the eluent generation chamber, the applied voltage or current with the second polarity generating the second electric field to inhibit the translocation of the eluent towards the second electrode.

3. The method of claim 2, wherein the voltage or current having the first polarity causes the first electrode to function as an anode and the second electrode to function as a cathode and the voltage or current having the second polarity causes the first electrode to function as a cathode and the second electrode to function as an anode, wherein the ion exchange barrier includes a cation exchange barrier.

4. The method of claim 3, wherein the applied voltage or current with the first polarity electrolytically generates hydronium ions at the first electrode and hydroxide at the second electrode.

5. The method of claim 4, wherein the applied voltage or current with the second polarity electrolytically generates hydronium ions at the second electrode and hydroxide at the first electrode.

6. The method of claim 2, wherein the voltage or current having the first polarity causes the first electrode to function as a cathode and the second electrode to function as an anode and the voltage or current having the second polarity causes the first electrode to function as an anode and the second electrode to function as a cathode, wherein the ion exchange barrier includes an anion exchange barrier.

7. The method of claim 6, wherein the applied voltage or current with the first polarity electrolytically generates hydronium ions at the second electrode and hydroxide at the first electrode.

8. The method of claim 7, wherein the applied voltage or current with the second polarity electrolytically generates hydronium ions at the first electrode and hydroxide at the second electrode.

9. The method of claim 1, wherein the ion exchange barrier substantially prevents liquid flow while providing an ion transport bridge.

10. The method of claim 1, wherein inhibiting the translocation of the eluent through the ion exchange barrier from the first side to the second side inhibits accumulation of the eluent on the second side.

11. The method of claim 1, further comprising waiting a first period of time between the step of selectively reversing the polarity of the voltage or current from the first polarity to the second polarity and the step of selectively reversing the polarity of the voltage or current from the second polarity to the first polarity.

12. The method of claim 11, wherein the first period of time is greater than or equal to about 4 hours.

13. The method of claim 11, further comprising initiating an automatic startup procedure, the automatic startup procedure occurring over a second period of time.

14. The method of claim 13, further comprising initiating an equilibration procedure, the equilibration occurring over a third period of time.

15. The method of claim 14, wherein the third period of time is less than or equal to about 60 minutes.

16. The method of claim 1, wherein the selectively reversing of the polarity of the voltage or current from the first polarity to the second polarity occurs during a passive or shutdown mode.

17. The method of claim 1, wherein the second electric field inhibits translocation of the eluent counter ions through the ion exchange barrier from the first side to the second side.

18. The method of claim 1 further comprising:
after selectively reversing the polarity of the voltage or current from the second polarity to the first polarity, injecting analyte ions into the ion exchange chromatography system.

19. The method of claim 1 further comprising:
waiting an equilibration time period at the first polarity after the selectively reversing the polarity of the voltage or current from the second polarity to the first polarity, and then
injecting analyte ions into the ion exchange chromatography system.

20. The method of claim 19, wherein the equilibration time period is less than 15 minutes.

* * * * *